(12) United States Patent
Sone

(10) Patent No.: US 7,278,037 B2
(45) Date of Patent: Oct. 2, 2007

(54) STORAGE CONTROL DEVICE AND CONTROL METHOD THEREFOR

(75) Inventor: Masahiro Sone, Numazu (JP)

(73) Assignee: Hitachi, Ltd., Tokyo (JP)

( * ) Notice: Subject to any disclaimer, the term of this patent is extended or adjusted under 35 U.S.C. 154(b) by 135 days.

(21) Appl. No.: 11/194,674

(22) Filed: Aug. 2, 2005

(65) Prior Publication Data

US 2005/0264911 A1    Dec. 1, 2005

Related U.S. Application Data

(63) Continuation of application No. 10/765,165, filed on Jan. 28, 2004, now Pat. No. 7,096,372.

(30) Foreign Application Priority Data

Nov. 26, 2003    (JP) .............................. 2003-396282

(51) Int. Cl.
   *G06F 1/00* (2006.01)
(52) U.S. Cl. .................................................... 713/300
(58) Field of Classification Search ................ 713/300; 711/113; 700/297
   See application file for complete search history.

(56) References Cited

U.S. PATENT DOCUMENTS

| | | | |
|---|---|---|---|
| 4,618,779 A | 10/1986 | Wiscombe | |
| 5,325,363 A | 6/1994 | Lui | |
| 5,724,542 A * | 3/1998 | Taroda et al. ............... | 711/113 |
| 5,768,117 A | 6/1998 | Takahashi et al. | |
| 5,842,030 A | 11/1998 | Larabell et al. | |
| 6,094,725 A | 7/2000 | Hiyoshi et al. | |
| 6,295,609 B1 | 9/2001 | Cargemel et al. | |
| 6,320,771 B1 | 11/2001 | Hemena et al. | |
| 6,381,156 B1 | 4/2002 | Sakai et al. | |
| 6,385,024 B1 | 5/2002 | Olson | |
| 2001/0047448 A1 | 11/2001 | Sueoka et al. | |
| 2002/0031000 A1 | 3/2002 | Sakai et al. | |
| 2002/0188383 A1* | 12/2002 | Elek et al. .................. | 700/297 |

FOREIGN PATENT DOCUMENTS

| | | |
|---|---|---|
| EP | 0502096 | 9/1995 |
| EP | 1361516 | 11/2003 |
| JP | 731150 | 1/1995 |
| JP | 2002 34177 | 1/2002 |

* cited by examiner

*Primary Examiner*—Thomas Lee
*Assistant Examiner*—Sean Weinman
(74) *Attorney, Agent, or Firm*—Mattingly, Stanger, Malur & Brundidge, P.C.

(57) ABSTRACT

A storage control device comprises: a first I/O control unit for controlling read/write of data from/to one or more HDDs (Hard Disk Drives); a second I/O control unit whose current consumption is approximately equal to that of the first I/O control unit; two or more first power supply devices supplying electric power to the first I/O control unit; two or more second power supply devices supplying electric power to the second I/O control unit; and at least three circuit breakers receiving electric power supplied from outside and supplying the electric power to the first and second power supply devices while interrupting the supply of the electric power when current exceeding a preset level passes. Each of the first/second power supply devices includes a current balancing circuit for equalizing output currents of the first/second power supply devices.

16 Claims, 18 Drawing Sheets

STORAGE CONTROL DEVICE AND CONTROL METHOD THEREFOR

CROSS-REFERENCE TO RELATED APPLICATIONS

The present application is a Continuation of application Ser. No. 10/765,165, filed Jan. 28, 2004 now U.S. Pat. No. 7,096,372, which claims priority of Japanese Patent Application No. 2003-396282, filed Nov. 26, 2003, the contents of which are incorporated herein by reference.

BACKGROUND OF THE INVENTION

The present invention relates to a storage control device for controlling a storage device, and a control method for the storage control device.

Today, information processing systems are playing a highly important role in business activities and above all, storage devices such as disk arrays for storing vast amounts of data as corporate assets are extremely important. Therefore, multi-level security measures are taken for protecting data stored in such storage devices. For example, in a storage control device of a storage device for controlling the operation of the whole storage device, many of internal electronic devices (power inlet devices such as breakers, power supplies, control devices, electric cables, etc.) are duplexed for redundancy and thereby exceedingly high reliability and availability are realized.

An example of such a storage device is disclosed in JP-A-2002-34177, for example.

SUMMARY OF THE INVENTION

In this case, each of the redundant (duplicated) power inlet devices has to have enough capacity for receiving the power to be consumed by the whole storage device. Further, electric current consumption of storage devices is increasing in recent years as a result of their increasing performance, by which the power inlet devices are more and more required to have larger electric power capacity.

In the case where the storage device is equipped with large-capacity power inlet devices, the capacity of power supply equipment of the place where the storage device is installed also needs to be increased. Increasing the capacity of the power supply equipment requires electrical work to the facilities (replacement/addition of a power switchboard, electric cables, etc.). As a measure for avoiding such electrical work, it is possible to partition each power inlet device of the storage device into a plurality of small-capacity power inlet devices. However, the increase of the number of power inlet devices causes upsizing of the storage device, increased complexity of the device, and an increase in the cost.

It is therefore the primary object of the present invention to provide a storage control device and a control method for the storage control device capable of resolving the above problems.

In accordance with an aspect of the present invention, there is provided a storage control device comprising: a first I/O control unit including a channel control unit being connected with an information processing device to communicate data and receiving a data I/O request from the information processing device, a disk control unit being connected with one or more HDDs (Hard Disk Drives) storing data and reading/writing data from/to the HDDs according to the data I/O request, a cache memory for storing data communicated between the channel control unit and the disk control unit, and a connection unit interconnecting the channel control unit, the disk control unit and the cache memory to communicate data; a second I/O control unit whose current consumption is approximately equal to that of the first I/O control unit; two or more first power supply devices supplying electric power to the first I/O control unit; two or more second power supply devices supplying electric power to the second I/O control unit; and at least three circuit breakers receiving electric power supplied from outside and supplying the electric power to the first and second power supply devices while interrupting the supply of the electric power when current exceeding a preset level passes. Each of the first/second power supply devices includes a current balancing circuit for equalizing output currents of the first/second power supply devices.

BRIEF DESCRIPTION OF THE DRAWINGS

The objects and features of the present invention will become more apparent from the consideration of the following detailed description taken in conjunction with the accompanying drawings, in which.

DETAILED DESCRIPTION OF THE EMBODIMENTS

Figure 1:
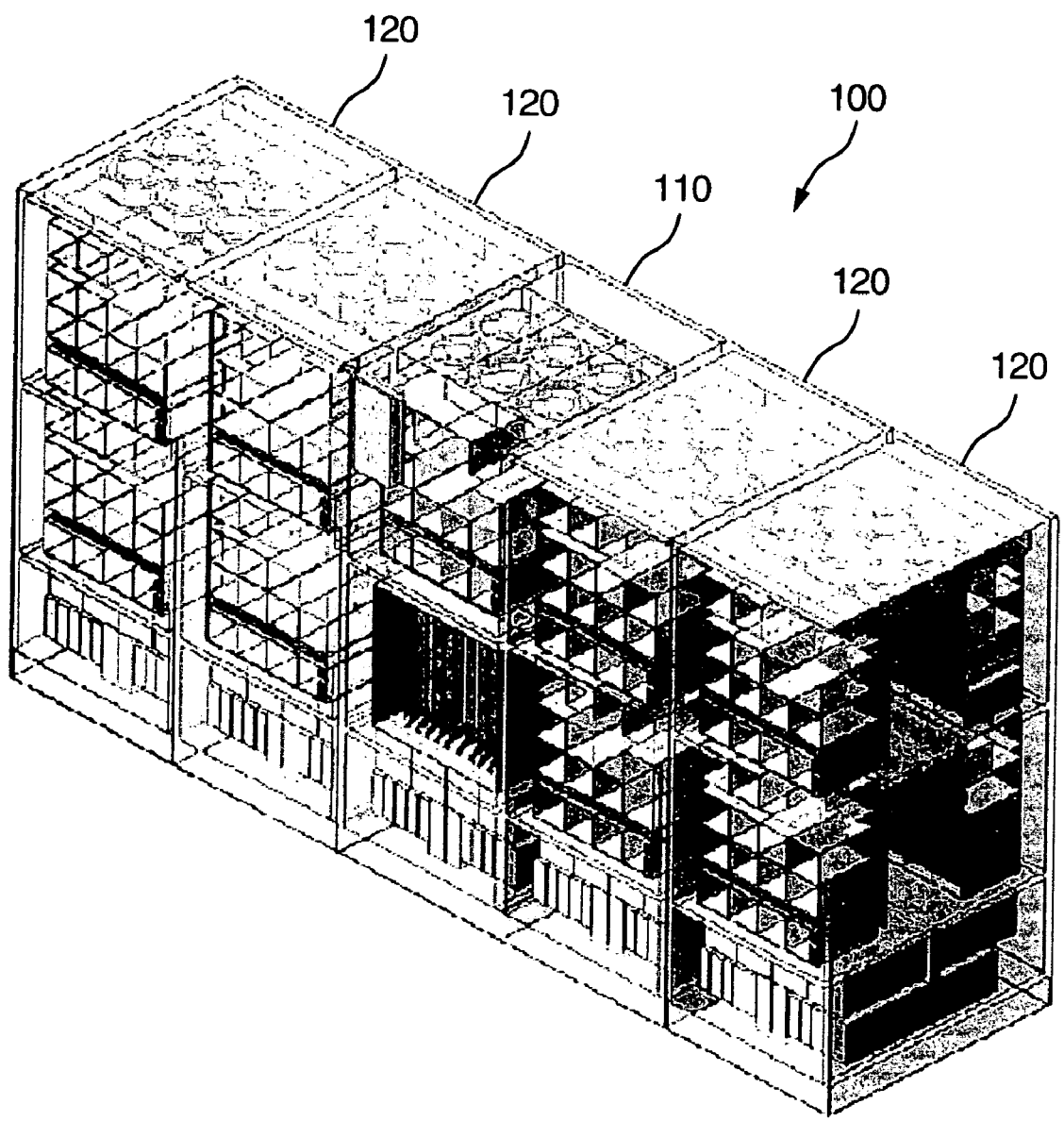
FIG. 1 is a perspective view showing the overall composition of a storage device (disk array device) in accordance with an embodiment of the present invention.

Referring now to the drawings, a description will be given in detail of preferred embodiments in accordance with the present invention.

[Overall Composition of Disk Array Device]

First, the overall composition of a storage device 100 (hereinafter also referred to as "disk array device 100") in accordance with an embodiment of the present invention will be described referring to FIG. 1. The disk array device 100 shown in FIG. 1 comprises a control device 110 (storage control device) and one or more drive devices 120. In the example of FIG. 1, the control device 110 is placed at the center of the disk array device 100, and the drive devices 120 are placed on both sides of the control device 110.

The control device 110 controls the operation of the whole disk array device 100. While details will be explained later, the control device 110 contains logic units 420 (for controlling the whole disk array device 100) and HDD (Hard Disk Drive) units 310 (for storing data) in its front part and rear part. Meanwhile, each drive device 120 contains HDD units 310 in its front part and rear part.

In the disk array device 100, a variety of electronic devices are installed with high packing density in order to attain both high storage capacity and downsizing. Although not shown in FIG. 1, AC power is supplied from external power supply equipment (e.g. power switchboard 1100) to the control device 110 and the drive devices 120 for enabling the electronic devices. In the following, detailed composition of the control device 110 and the drive device 120 will be described referring to FIG. 2A through FIG. 5.

[Control Device]

Figures 2A, 2B:
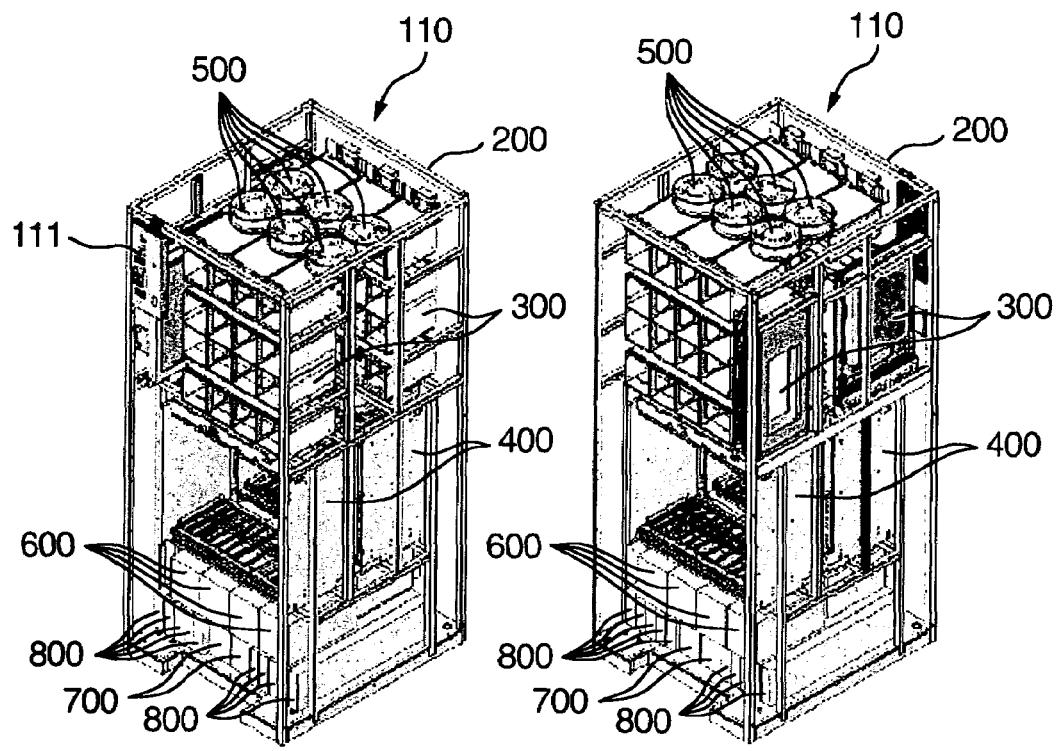
FIGS. 2A and 2B are perspective views showing the overall composition of a control device of the storage device of the embodiment.

FIGS. 2A through 4 are perspective views showing the composition of the control device 110. FIG. 2A and FIG. 2B view the control device 110 from its right front and left rear, respectively.

The control device 110 contains HDD modules 300, logic modules 400, batteries 800, AC boxes (circuit breakers) 700, AC/DC power supplies (power supply devices) 600, fans 500 and an operator panel 111 in its cabinet 200.

The HDD modules 300 are stored in the upper part of the cabinet 200. In each HDD module 300, a plurality of HDD units 310 for storing data are detachably installed in rows and a plurality of fiber channel switches 150 (hereinafter also referred to as "FSWs 150") are also installed detachably.

Each HDD unit 310 includes an HDD (Hard Disk Drive) 311 for storing data, a DC-DC converter, a control circuit, etc. which are stored in a canister. The DC-DC converter receives the DC power (rated voltage: 56V) supplied from the AC/DC power supply 600 to the HDD unit 310, converts the rated voltage 56V of the DC power into 5V and 12V, and supplies the converted DC power to the HDD 311, the control circuit, etc. The 12V DC power is supplied to, for example, a motor which spins disks of the HDD 311. The 5V DC power is supplied to, for example, the control circuit which reads/writes data from/to the HDD 311.

The logic modules 400 are stored in the middle part of the cabinet 200. Each logic module 400 includes a logic unit 420 and a plurality of logic module fans 410. The logic unit 420 includes a plurality of control circuit boards 430 having various functions for reading/writing data from/to the HDDs 311. While details will be described later, each control circuit board 430 of the logic unit 420 includes at least one selected from a channel adapter (channel control unit) 131, a cache memory 133, a shared memory 135, a connection unit 132 and a disk adapter (disk control unit) 134. On the control circuit board 430, a plurality of electronic circuits (operating at various voltages) and a DC-DC converter (for generating the various voltages from the 56V DC power supplied from the AC/DC power supply 600) are formed. Each of the channel adapter 131, cache memory 133, shared memory 135, connection unit 132 and disk adapter 134 is duplexed for redundancy in order to increase the reliability of the disk array device 100. Thus, a first I/O control unit is formed by a first channel adapter 131, first cache memory 133, first shared memory 135, first connection unit 132 and first disk adapter 134, while a second I/O control unit is formed by a second channel adapter 131, second cache memory 133, second shared memory 135, second connection unit 132 and second disk adapter 134. Current consumption of the first I/O control unit is substantially equal to that of the second I/O control unit. Hereinafter, the channel adapter 131, cache memory 133, shared memory 135, connection unit 132 and disk adapter 134 will also be referred to as "I/O control unit". Of course the I/O control unit does not have to include all the above components. The I/O control unit may be built up in any composition as long as it can realize the functions for reading/writing data from/to the HDDs 311 in response to data I/O requests supplied from an information processing device 1000. The logic module fans 410 supply cooling air to the logic unit 420. The cooling air taken in the cabinet 200 enters a logic module 400 from its front through gaps between the control circuit boards 430 of the logic unit 420, cools the logic unit 420, and is discharged through the top of the cabinet 200 by the sucking force of the logic module fans 410 and the fans 500.

Figure 8:
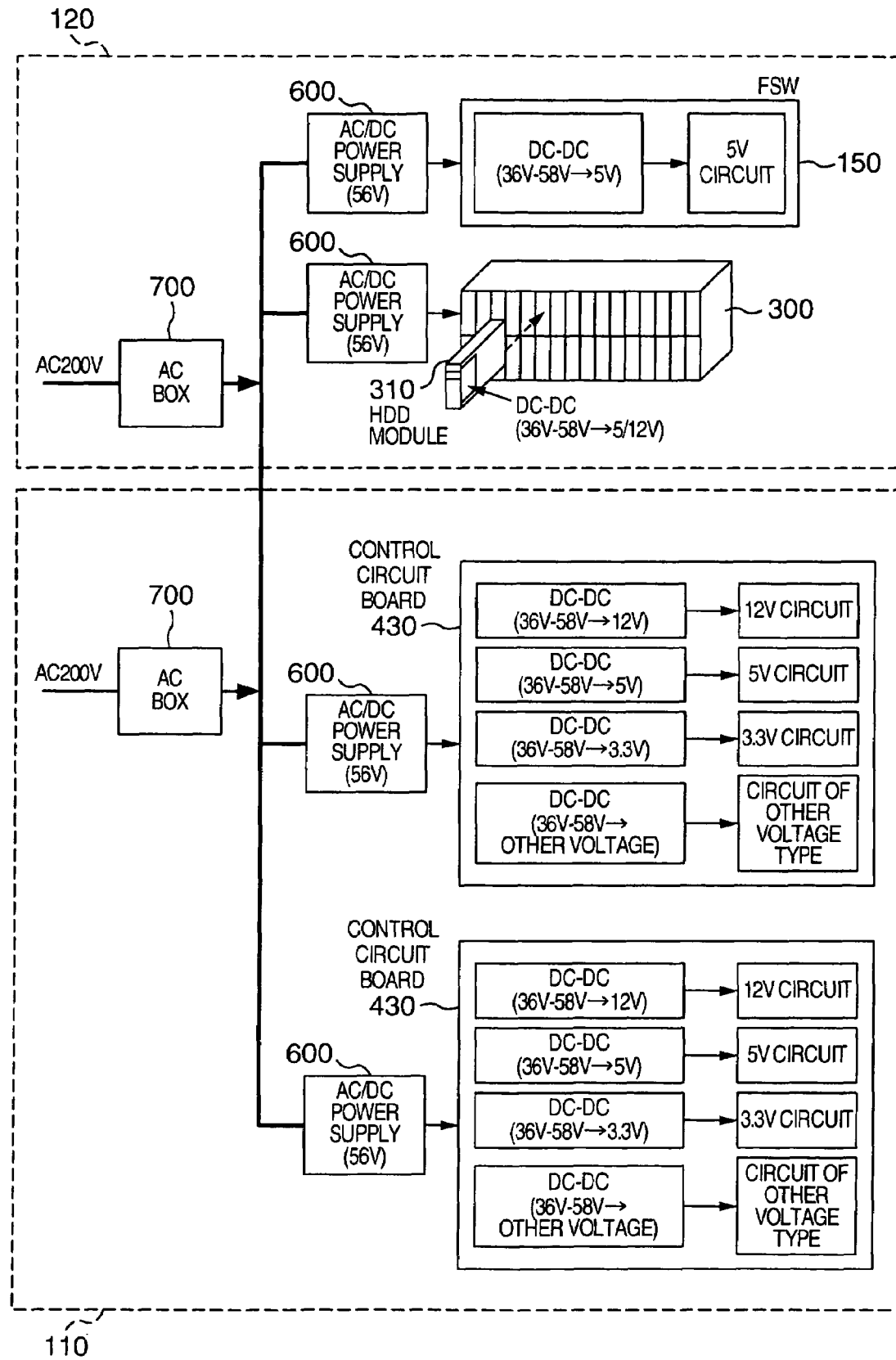
FIG. 8 is a block diagram showing the mechanism of power supply of the storage device of the embodiment.
Figure 9:
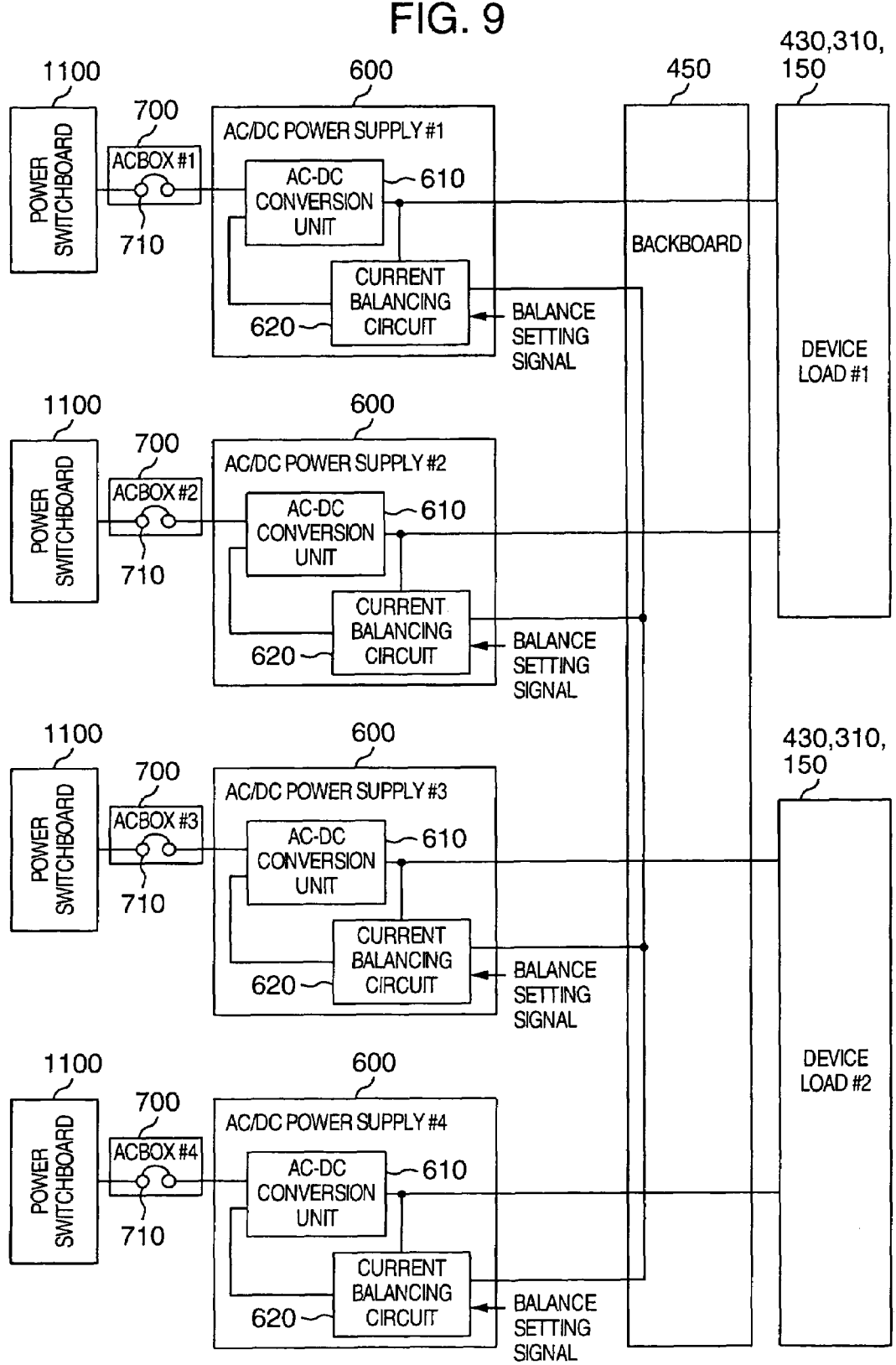
FIG. 9 is a block diagram showing the mechanism of power supply of the storage device of the embodiment.
Figure 15:
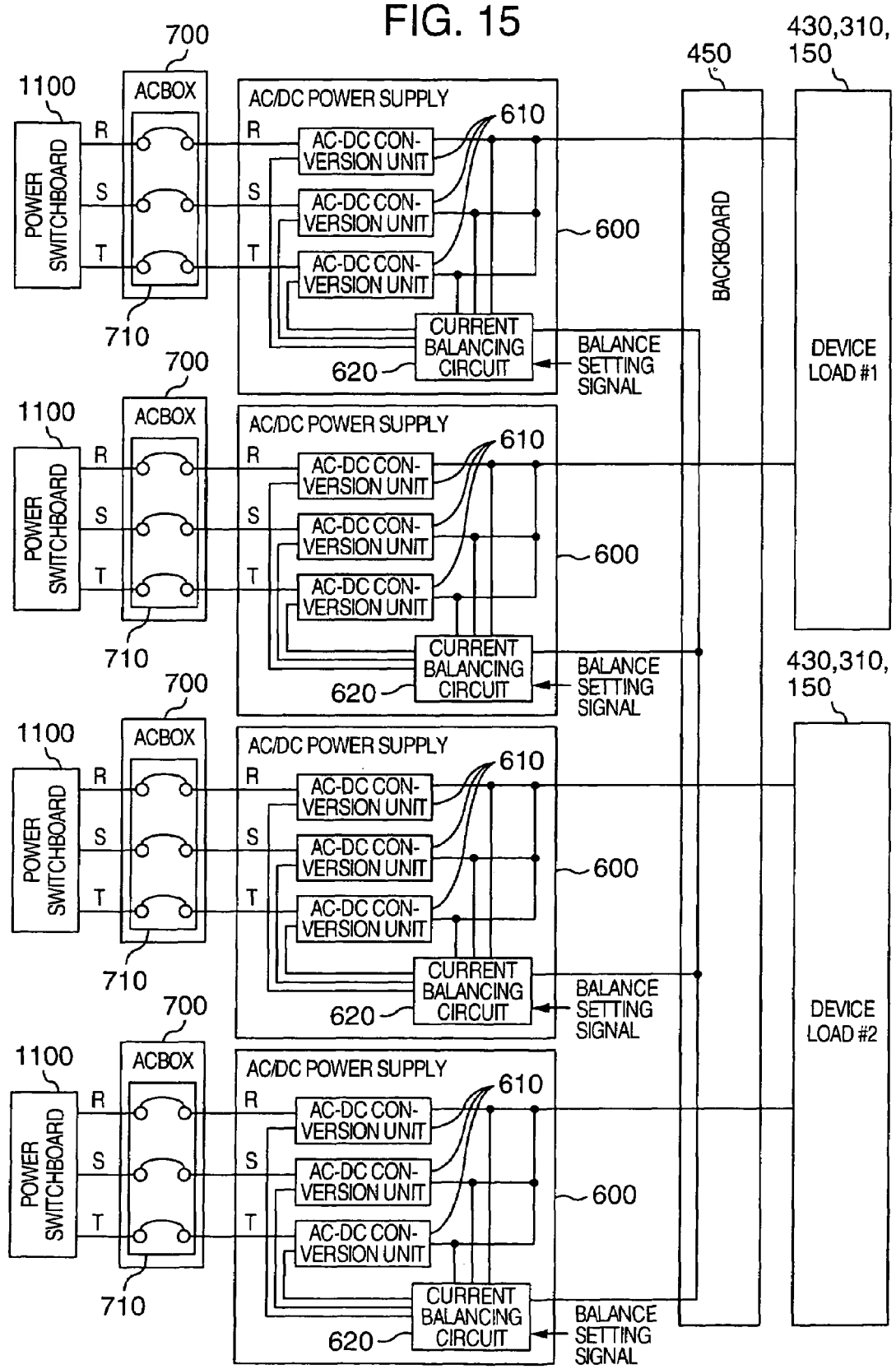
FIG. 15 is a block diagram showing the mechanism of power supply of the storage device of the embodiment.

The batteries 800, the AC boxes 700 and the AC/DC power supplies 600 are stored in the lower part of the cabinet 200. Hereinafter, the batteries 800, AC boxes 700 and AC/DC power supplies 600 will also be referred to as "power supply module". The mechanism for power supply to the disk array device 100 of this embodiment is shown in FIGS. 8, 9 and 15.

Figure 18:
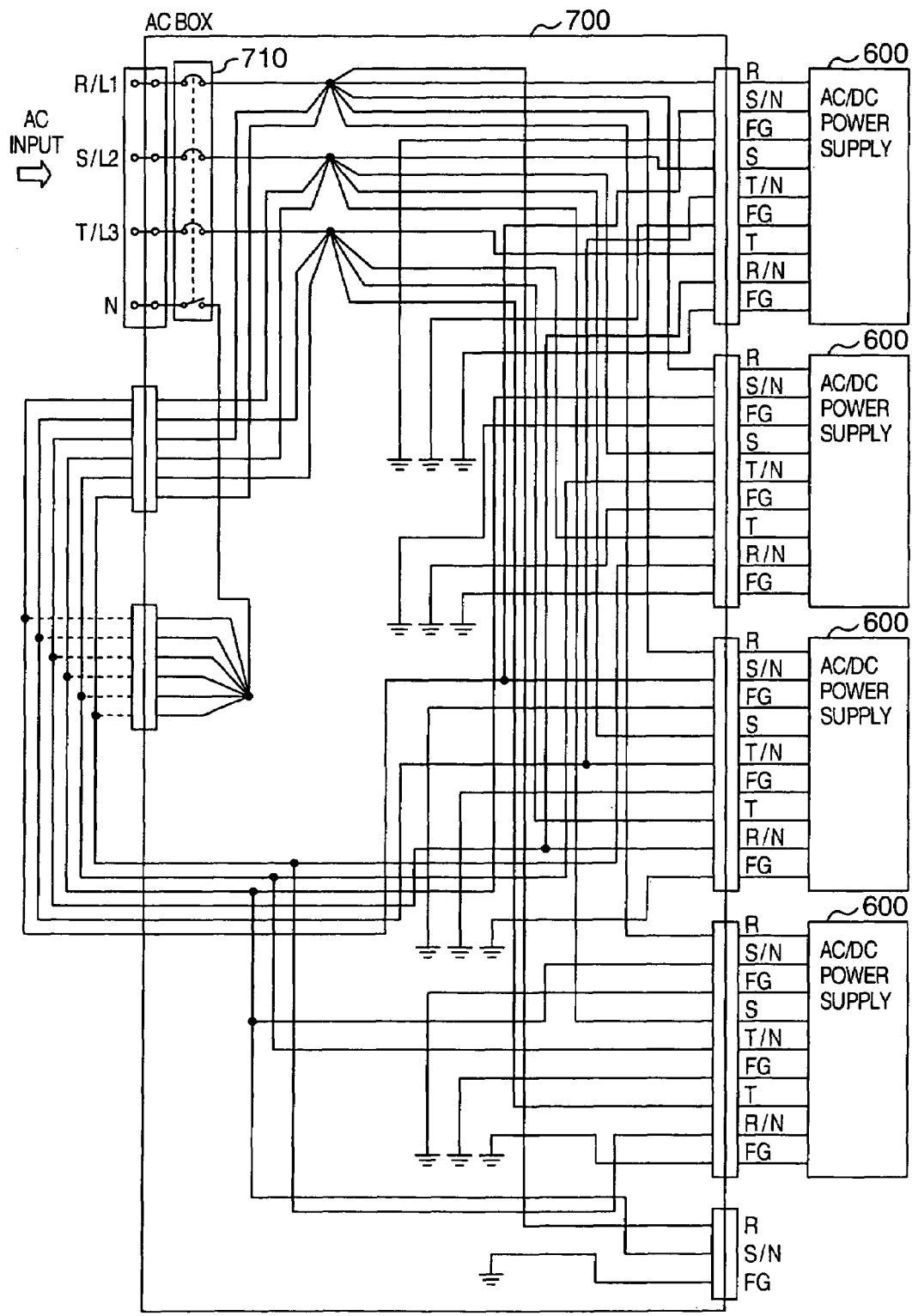
FIG. 18 is a circuit diagram showing an example of the composition of an AC box of the storage device for three-phase AC power.
Figure 19:
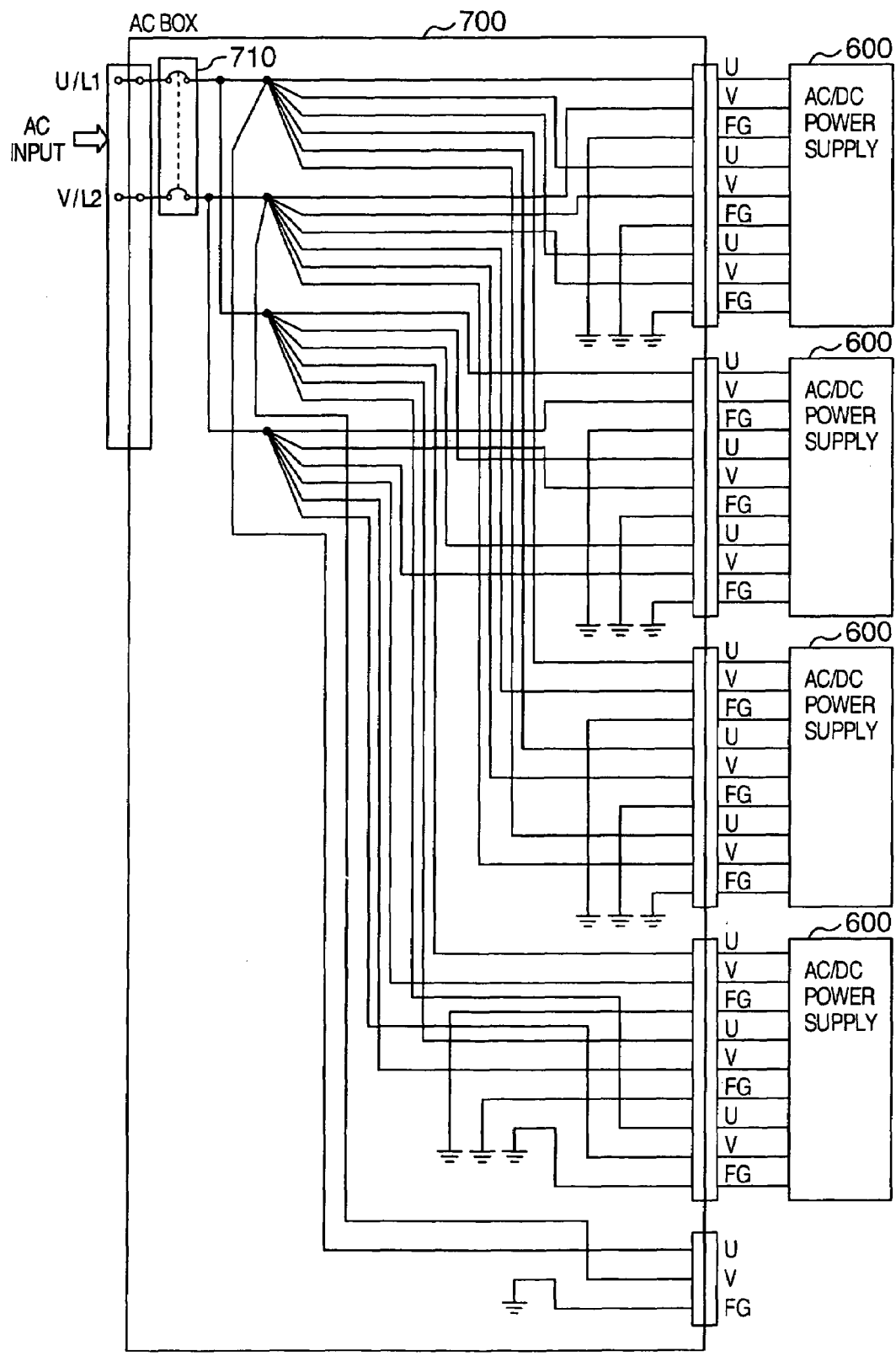
FIG. 19 is a circuit diagram showing an example of the composition of an AC box of the storage device for single-phase AC power.

Each AC box 700, serving as an electric power intake of the disk array device 100, is provided with a breaker 710. The AC box 700 is supplied with AC power from the power supply equipment (e.g. power switchboard 1100) which is set up outside the disk array device 100. The AC power supplied to the AC box 700 may either be three-phase AC power or single-phase AC power. The AC power supplied to the AC box 700 from outside the disk array device 100 is then supplied to the AC/DC power supply 600 through an electric cable detachably connecting the AC box 700 and the AC/DC power supply 600. Since the AC box 700 has the breaker 710, the supply of power to the AC/DC power supply 600 is interrupted by the breaker 710 when the current passing through the breaker 710 exceeds a preset level. Examples of the composition of the AC box 700 are shown in FIGS. 18 and 19, in which FIG. 18 shows an AC box 700 that is supplied with three-phase AC power and FIG. 19 shows an AC box 700 that is supplied with single-phase AC power. As seen from the figures, the disk array device 100 of this embodiment can easily be adapted to both three-phase AC power and single-phase AC power depending on the type of the power supply equipment (e.g. power switchboard 1100) of the user, by replacing the AC box 700 and the electric cables detachably connecting the AC box 700 and the AC/DC power supplies 600.

Figure 16:
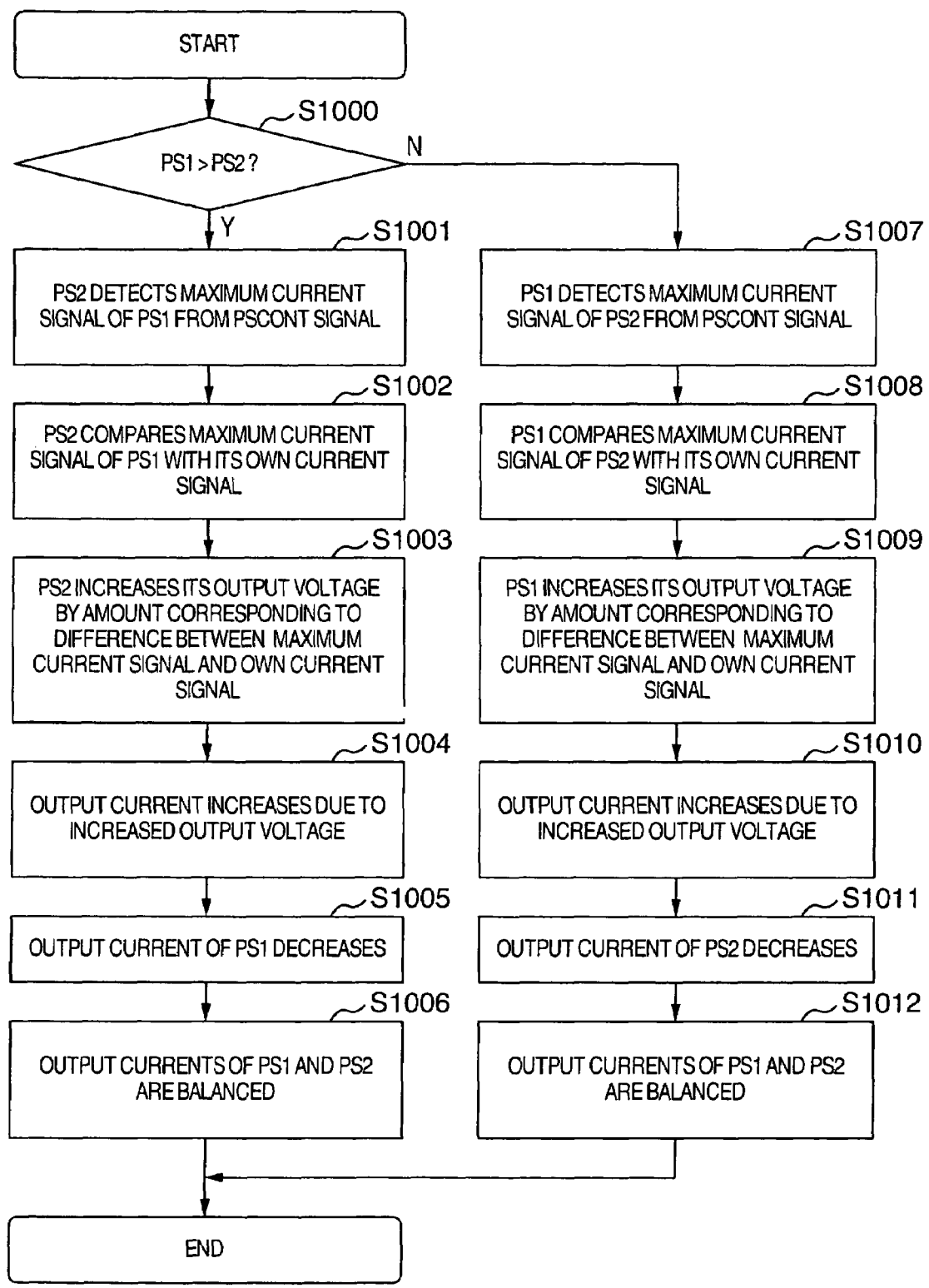
FIG. 16 is a flow chart showing the operation of current balancing circuits for controlling and equalizing DC output currents of AC/DC power supplies of the storage device.

The AC/DC power supply 600, including an AC-DC conversion unit 610 for converting the AC power to DC power, is a power supply device for supplying DC power to the I/O control unit of the logic unit 420, the HDD units 310, etc. The AC/DC power supply 600 further includes a current balancing circuit 620. The current balancing circuits 620 of the AC/DC power supplies 600 are connected together by a rear circuit board 450 (hereinafter also referred to as "backboard 450"), by which the DC output currents of the AC/DC power supplies 600 are equalized with one another. The operation of the current balancing circuit 620 for controlling and equalizing the DC output currents is shown in a flow chart of FIG. 16. FIG. 16 shows a case where DC output currents of two AC/DC power supplies 600 are equalized with each other. Incidentally, the two AC/DC power supplies 600 are abbreviated as "PS1" and "PS2" in FIG. 16.

First, when the output current of PS1 is larger than that of PS2 (YES in S1000), PS2 detects a maximum current signal of PS1 from a PSCONT signal supplied thereto (S1001). The PSCONT signal is communicated through, for example, a circuit that interconnects the current balancing circuits 620 via the backside circuit board 450. Subsequently, PS2 compares the maximum current signal with its own current signal (S1002) and increases its output voltage by an amount corresponding to the difference between the maximum current signal and the own current signal (S1003), by which the output current of PS2 increases (S1004), the output current of PS1 decreases (S1005), and thereby the output currents of PS1 and PS2 are balanced and equalized with each other (S1006). On the other hand, when the output current of PS1 is not larger than that of PS2 (NO in S1000), PS1 detects a maximum current signal of PS2 from a PSCONT signal supplied thereto (S1007). Subsequently, PS1 compares the maximum current signal with its own current signal (S1008) and increases its output voltage by an amount corresponding to the difference between the maximum current signal and the own current signal (S1009), by which the output current of PS1 increases (S1010), the output current of PS2 decreases (S1011), and thereby the output currents of PS1 and PS2 are balanced and equalized with each other (S1012).

The current balancing circuit 620 is capable of not only equalizing the output currents of the AC/DC power supplies 600 but also setting the ratio among the output currents at a particular ratio. The setting of the output current ratio can be done by inputting a balance setting signal to the current balancing circuits 620. The balance setting signal may be inputted to the current balancing circuits 620 by the operator of the disk array device 100 (who maintains and manages the disk array device 100) by turning a volume knob (trimmer) on the disk array device 100, for example. The balance setting signal may also be implemented as a control signal that is supplied from a management terminal 136 (explained later). Inputting the balance setting signal to each AC/DC power supply 600 makes it is possible, for example, to set the output current ratio of two AC/DC power supplies 600 to 2:1.

FIG. 15 shows the mechanism of power supply when three-phase AC power is supplied to the AC box 700. In this example, the AC box 700 has a breaker 710 for each phase (R, S, T) of the three-phase AC power. When the current of a phase exceeds a preset level, power supply of the phase is interrupted by the breaker 710. The AC/DC power supply 600 is provided with an AC-DC conversion unit 610 for each phase (R, S, T). The current balancing circuit 620 controls the DC output current so as to equalize the DC output currents of the AC/DC power supplies 600 as well as equalizing output currents of the three phases R, S and T. The composition of the AC/DC power supply 600 of FIG. 15 can be used for both three-phase AC power and single-phase AC power. For three-phase AC power, each of the three AC-DC conversion units 610 of the AC/DC power supply 600 converts the AC power of each phase (R, S, T) into DC power respectively. For single-phase AC power, each AC-DC conversion unit 610 converts each input AC power into DC power. Also in the case of single-phase AC power, the current balancing circuit 620 controls the DC output current so as to equalize the DC output currents of the AC/DC power supplies 600 as well as equalizing output currents of the three lines.

Each electronic device such as the I/O control unit of the logic unit 420, the HDD unit 310 and the fiber channel switch 150 is a "device load" that consumes the power supplied from the AC/DC power supply 600. The electronic devices as the device loads (logic unit 420, HDD unit 310, etc.) consume DC power of different rated voltages. For example, the control circuit board 430 of the logic unit 420 of this embodiment consumes DC power of a rated voltage of 5V, 3.3V or the like, while the rated voltage of the HDD unit 310 is 12V or 5V and that of the fiber channel switch 150 is 5V. For this reason, the DC-DC converter for converting DC voltage is provided to the control circuit boards 430, HDD unit 310s, etc. of this embodiment, and DC power of a single rated voltage is supplied to the device loads (control circuit boards 430, HDD units 310, etc.).

Concretely, the AC/DC power supply 600 receives 200V AC power and converts it into 56V DC power. The DC-DC converter of each device load (control circuit boards 430, HDD units 310, etc.) generates the particular voltage (12V, 5V, etc.) from the single input voltage of 56V. Incidentally, the voltages mentioned above are only examples and can of course be altered.

The battery 800 is a storage battery for supplying electric power to the DC-DC converter of each device (HDD 311, control circuit board 430, etc.) of the control device 110 in place of the AC/DC power supply 600 in case of interruption of power supply from the AC/DC power supply 600 due to blackout, failure of the AC/DC power supply 600, etc.

The operator panel 111, provided to the front of the cabinet 200, is a device for receiving inputs from the operator maintaining and managing the disk array device 100.

The rear circuit board (backboard) 450 is a circuit board having a circuit for electrically interconnecting the logic units 420, HDD units 310 and the power supply module.

[Drive Device]

Figure 3:
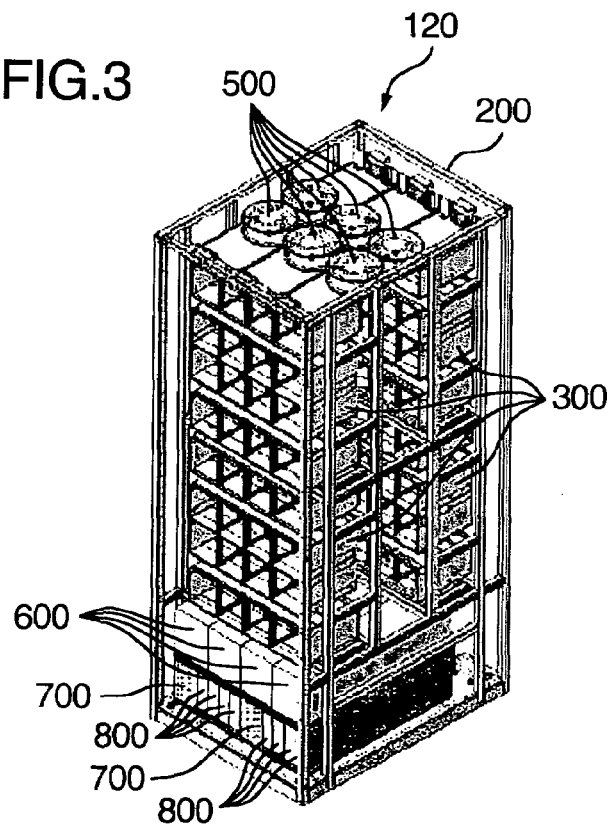
FIG. 3 is a perspective view showing the overall composition of a drive device of the storage device of the embodiment.
Figure 4:
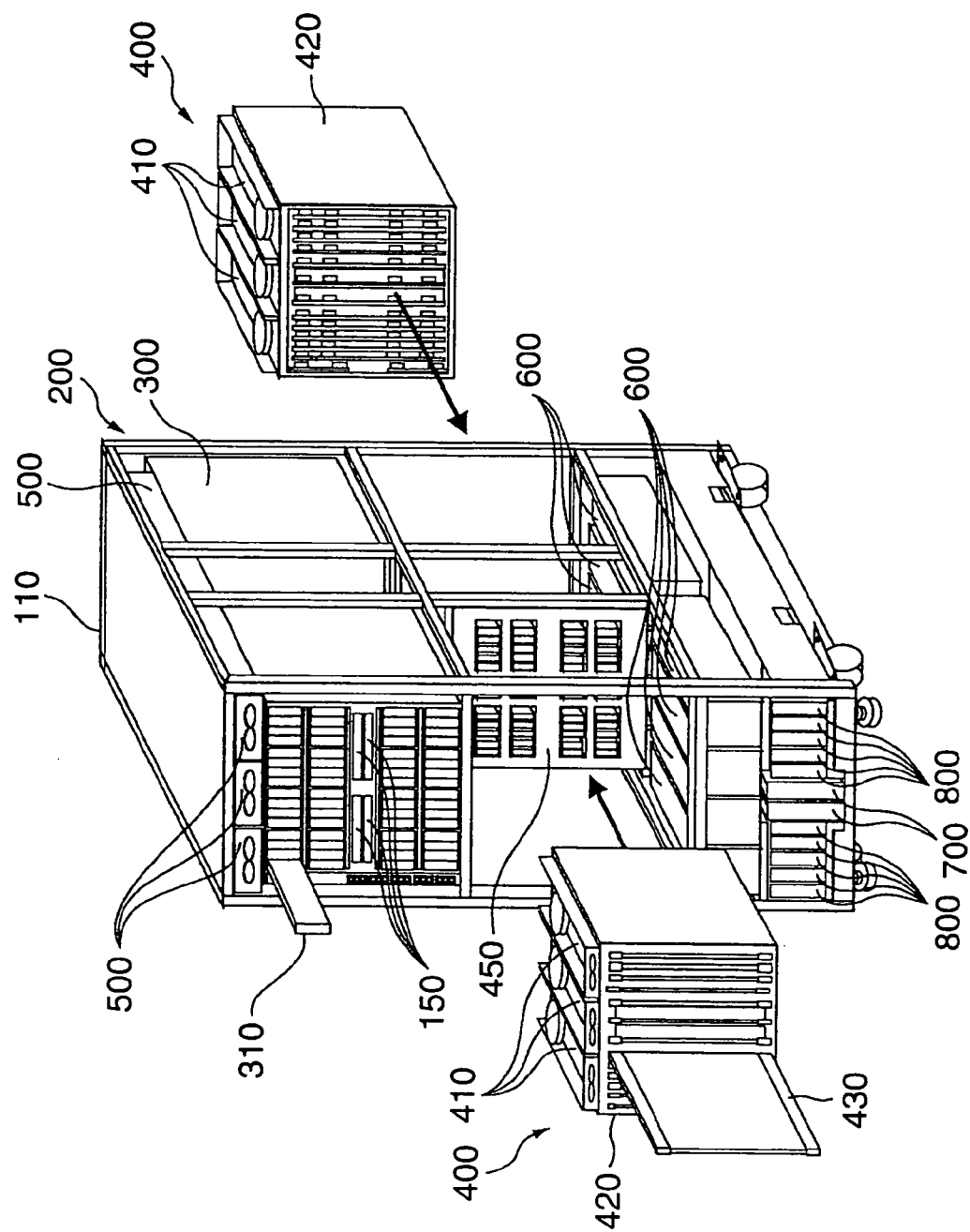
FIG. 4 is a perspective view showing control module boxes (logic modules) being stored in the control device of the embodiment.
Figure 5:
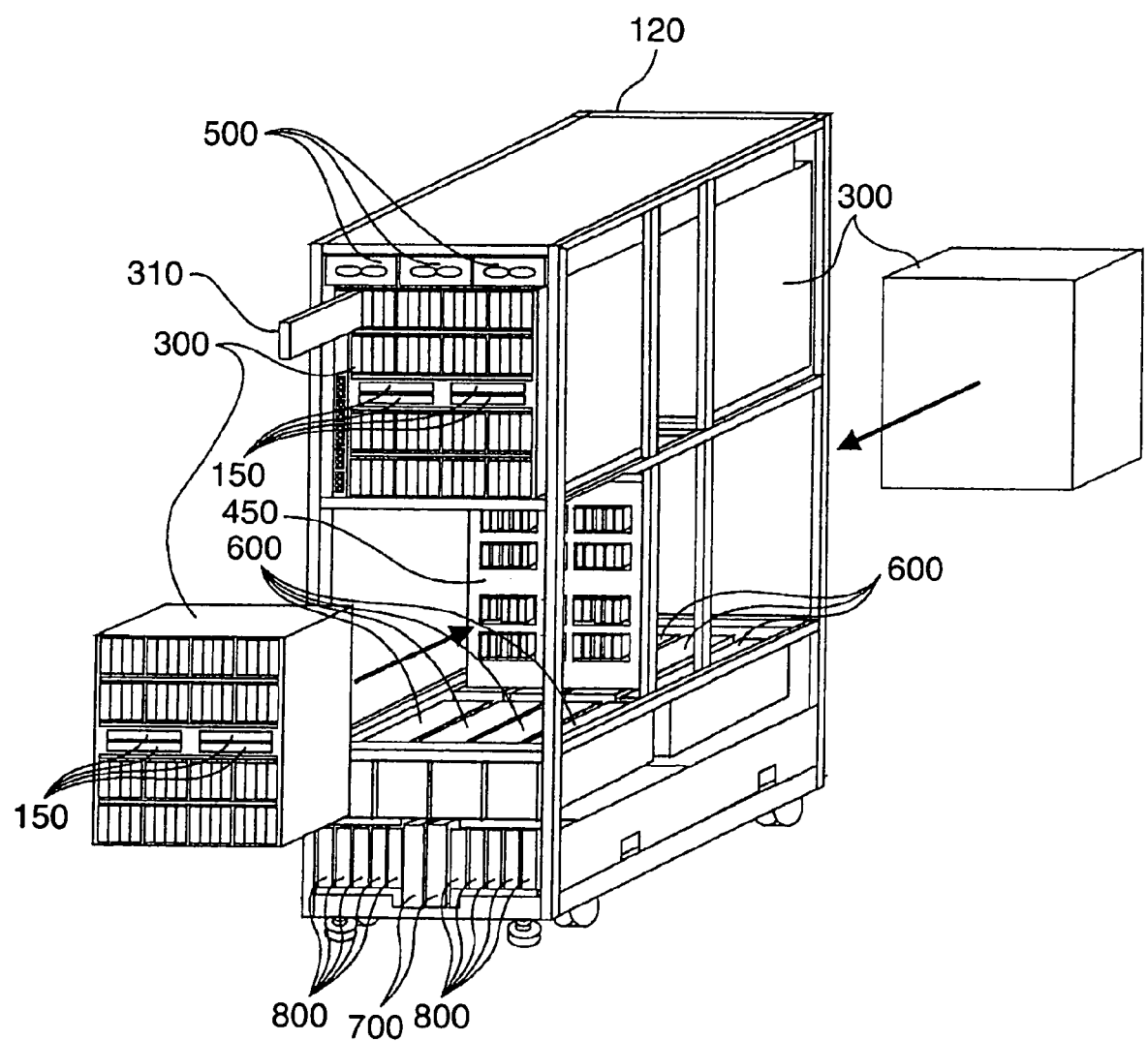
FIG. 5 is a perspective view showing HDD boxes (HDD modules) being stored in the drive device of the embodiment.

FIGS. 3 and 5 are perspective views showing the composition of the drive device 120, in which FIG. 3 views the drive device 120 from its right front. The drive device 120 contains HDD modules 300, batteries 800, AC boxes 700, AC/DC power supplies 600 and fans 500 in its cabinet 200 in the shape of a rectangular parallelepiped. Each component (300, 500, 700, 800) of the drive device 120 is the same as that of the control device 110. The cabinet 200 of the control device 110 and that of the drive device 120 can be formed in the same structure. In this case, the control device 110 can be built up by storing the logic modules 400 in the middle part of the cabinet 200, while the drive device 120 can be built up by storing the HDD modules 300 in the middle part.

[Composition of Disk Array Device]

Figure 6:
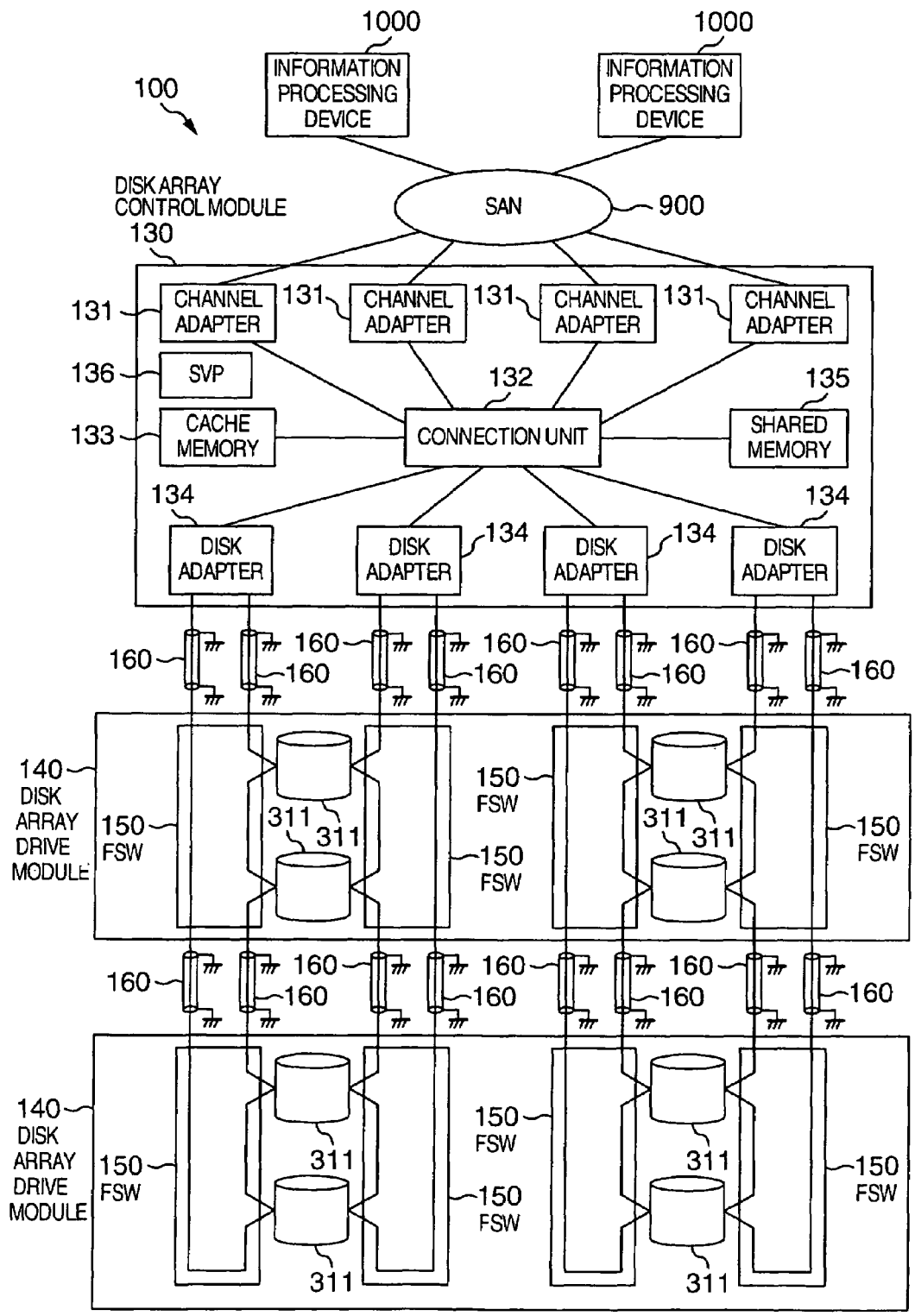
FIG. 6 is a block diagram showing the internal composition of the storage device of the embodiment.

FIG. 6 is a block diagram showing the internal composition of the disk array device 100 of this embodiment. The disk array device 100 is connected with the information processing devices 1000 via a SAN (Storage Area Network) 900 to communicate data.

The information processing device 1000 is information equipment (e.g. computer) including a CPU (Central Processing Unit) and memory. Various programs are run by the CPU of the information processing device 1000 and thereby a variety of functions are realized. The information processing device 1000 may be used as, for example, a centric computer of an automatic cash dispenser system for a bank, a seat reservation system for an airline company, etc. The disk array device 100, which may store business data of such social and public importance, is required extremely high reliability.

The SAN 900 is a network for communicating data between the information processing device 1000 and the disk array device 100. The communication between the information processing device 1000 and the disk array device 100 via the SAN 900 is executed typically according to the fiber channel protocol. The information processing device 1000 transmits data I/O requests to the disk array device 100 by the fiber channel protocol.

The disk array device 100 of this embodiment includes a disk array control module 130 and disk array drive modules 140. The disk array control module 130 is formed in the control device 110, while the disk array drive modules 140 are formed in the control device 110 or drive device 120. In other words, the control device 110 includes the disk array control module 130 and the disk array drive modules 140, while the drive device 120 includes the disk array drive modules 140.

The disk array control module 130 receives a data I/O request from an information processing device 1000 and reads/writes data from/to an HDD 311 of a disk array drive module 140 according to the received data I/O request. The disk array control module 130 includes the channel adapters 131, cache memory 133, connection unit 132, shared memory 135, disk adapters 134 and management terminal 136 (hereinafter, also referred to as "SVP 136"). Each of the channel adapter 131, cache memory 133, connection unit 132, shared memory 135 and disk adapter 134 is implemented by the control circuit board 430 constituting the logic unit 420 which has been shown in FIG. 4.

Each channel adapter 131 is connected to the information processing devices 1000 to communicate data. The channel adapter 131 receives a data I/O request from an information processing device 1000 according to the fiber channel protocol for example, and communicates data with the information processing device 1000.

The cache memory 133 and the shared memory 135 are memory for storing data and commands that are communicated between the channel adapters 131 and the disk adapters 134. For example, when the data I/O request that the channel adapter 131 receives from the information processing device 1000 is a read request, the channel adapter 131 writes the write request to the shared memory 135 while writing write data received from the information processing device 1000 to the cache memory 133, by which a disk adapter 134 reads the write data from the cache memory 133 according to the write request stored in the shared memory 135 and writes the write data to an HDD 311.

The connection unit 132 interconnects the channel adapters 131, shared memory 135, cache memory 133 and disk adapters 134 to communicate data. The connection unit 132 is implemented by, for example, a crossbar switch.

Each disk adapter 134 is connected to the HDDs 311 storing data. The disk adapter 134 communicates with the HDDs 311 according to the data I/O requests and thereby reads/writes data from/to the HDDs 311. The data read/write is done through, for example, a communication link constituting a loop specified by the FC-AL of the fiber channel standards (hereinafter, also referred to as "FC-AL loop"). The communication link is formed to include the disk adapter 134, communication cables 160, FSWs 150 and HDDs 311. The communication between the disk adapter 134 and the HDD 311 is relayed by the FSW (Fiber channel Switch) of the disk array drive module 140.

The management terminal 136 is information equipment for maintaining and managing the disk array device 100. The management terminal 136 can be implemented by, for example, a foldable notebook computer having a display and a keyboard. The management terminal 136 is stored in the control device 110. Of course it is also possible to place the management terminal 136 outside the control device 110. For example, the management terminal 136 may be implemented by a computer at a remote location which is connected to the control device 110 via a communication network. The type of the computer is not limited to notebook computers but other types (desktop computer, etc.) can be used for the management terminal 136. The management terminal 136 may either be implemented as a special-purpose information processing device exclusively for the maintenance/management of the disk array device 100 or a general-purpose information processing device to which the maintenance/management functions for the disk array device 100 are added.

Incidentally, the channel adapters 131, disk adapters 134, cache memory 133, shared memory 135 and connection unit 132 which are shown separately in FIG. 6 may also be formed integrally. It is also possible to form part of the components integrally.

[Fiber Channel Switch (FSW)]

Figure 7:
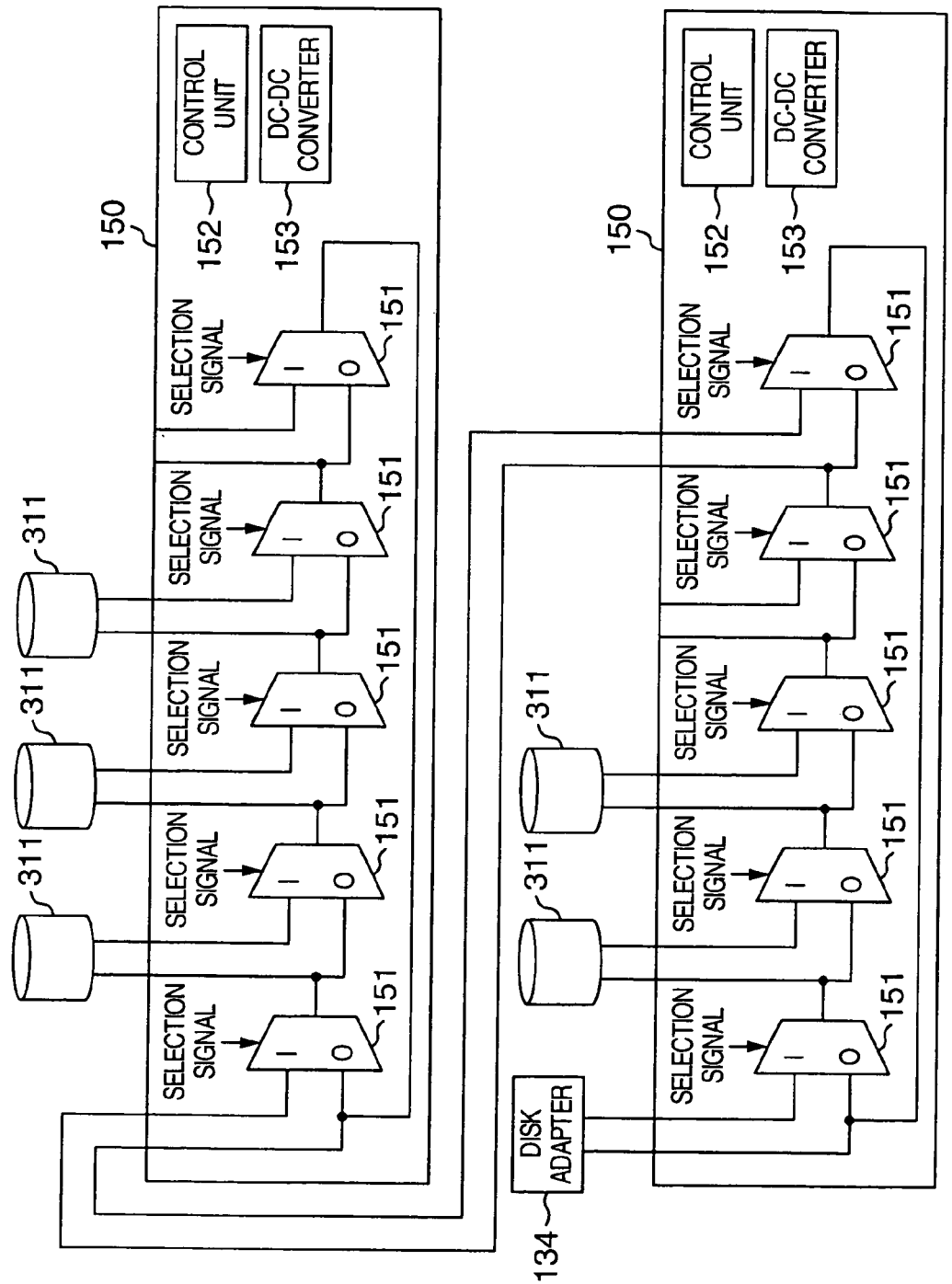
FIG. 7 is a block diagram showing the connection of a disk adapter of the storage device to HDDs through a communication link.

FIG. 7 is a block diagram showing the connection of the disk adapter 134 to the HDDs 311 through the communication link constituting the FC-AL loop. As shown in FIG. 7, the FC-AL loop can be formed by connecting the disk adapter 134 and the HDDs 311 to multiplexers 151 of the FSW 150. In the example of FIG. 7, an FC-AL loop is formed across two FSWs 150.

The "selection signal" supplied to each multiplexer 151 is a signal for selecting one of the two input terminals ("0" and "1") of the multiplexer 151. A selection signal designating the input terminal "1" is supplied to a multiplexer 151 when a disk adapter 134 or HDD 311 is connected to the multiplexer 151, while a selection signal designating the input terminal "0" is supplied when no device is connected to the multiplexer 151. When a failure occurring to an HDD 311 is detected, the selection signal designating the input terminal "0" is supplied to the multiplexer 151 connected to the HDD 311. The selection signals supplied to the multiplexers 151 are controlled by a control unit 152, for example.

In addition to the multiplexers 151, the FSW 150 is further provided with the control unit 152 and a DC-DC converter 153.

The control unit 152 controls the FSWs 150 and the DC-DC converters of the HDD units 310. The control of the FSWs 150 includes the control of the selection signal supplied to each FSW 150. The control unit 152 controls the selection signal when an HDD 311 is set to a state capable of communicating with the disk adapter 134, when the communication of an HDD 311 with the disk adapter 134 is disabled, etc.

The DC-DC converter 153 converts the 56V DC power supplied from the AC/DC power supply 600 into DC power for the FSW 150 (e.g. 5V DC power).

[Mechanism of Power Supply]

Figure 10:
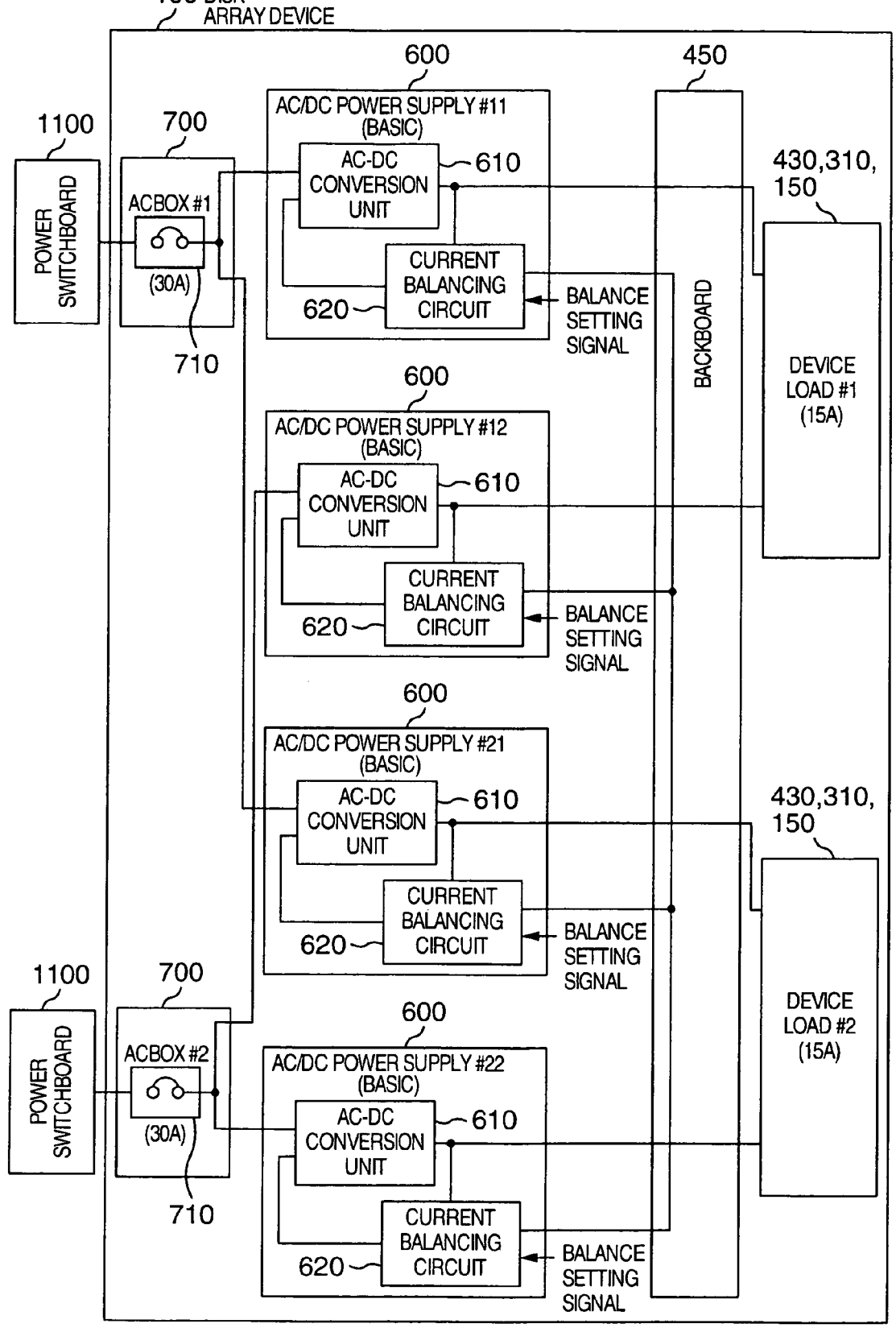
FIG. 10 is a block diagram showing power supply to device loads of a storage device.

Next, the mechanism of power supply to the disk array device 100 will be explained. Since the disk array device 100 is required extremely high reliability as mentioned before, the power supply to the disk array device 100 is duplexed for redundancy as shown in FIG. 10. Concretely, each of the redundant (duplexed) AC boxes 700 supplies power to redundant AC/DC power supplies 600 which are redundantly provided to each device load (Each device load is provided with the same number of redundant AC/DC power supplies 600.). In this case, the AC boxes 700 are connected so as to supply power to different AC/DC power supplies 600, by which the control of the disk array device 100 can be maintained even in case of failure occurring to an AC box 700, AC/DC power supply 600 or device load. The disk array device 100 of FIG. 10 has two AC boxes 700, for example. Even when the breaker 710 of one of the AC boxes 700 trips and thereby power supply is interrupted, the power supply to the electronic devices of the disk array device 100 is continued by another AC box 700. In order to realize such composition, each device load of the disk array device 100 is provided with the same or larger number of AC/DC power supplies 600 (for supplying power thereto) than the AC boxes 700. Like FIG. 9, in the arrangement of FIG. 10, each of the AC/DC power supplies 600 is formed by an AC-DC conversion unit 610 and a current balancing circuit 620 so as to equalize the output currents of the AC/DC power supplies 600, and further a backboard 450 is provided. Further, like FIG. 9, the current balancing circuit 620 is capable of not only equalizing the output currents of the AC/DC power supplies 600 but also setting the ratio among the output currents at a particular ratio. Further, although not shown in the drawings, in the arrangement of each of FIGS. 11 to 14, each of the AC/DC power supplies 600 is formed by an AC-DC conversion unit 610 and a current balancing circuit 620 so as to equalize the output currents of the AC/DC power supplies 600, and further a backboard 450 is provided.

In the case where the breaker 710 of one of the AC boxes 700 trips and thereby power supply is interrupted, current for covering power consumption of both the device loads #1 and #2 passes through the other AC box 700. Assuming the current consumption of each device load #1, #2 of the example of FIG. 10 is 15 A, current as high as 30 A may pass through the breaker 710 of each AC box 700. Therefore, a breaker 710 that can stand (without tripping) at least 30 A has to be used for each AC box 700 of the disk array device 100 of FIG. 10. In this case, the power switchboard 1100 is of course required to have high capacity for withstanding such high current.

Figure 11:
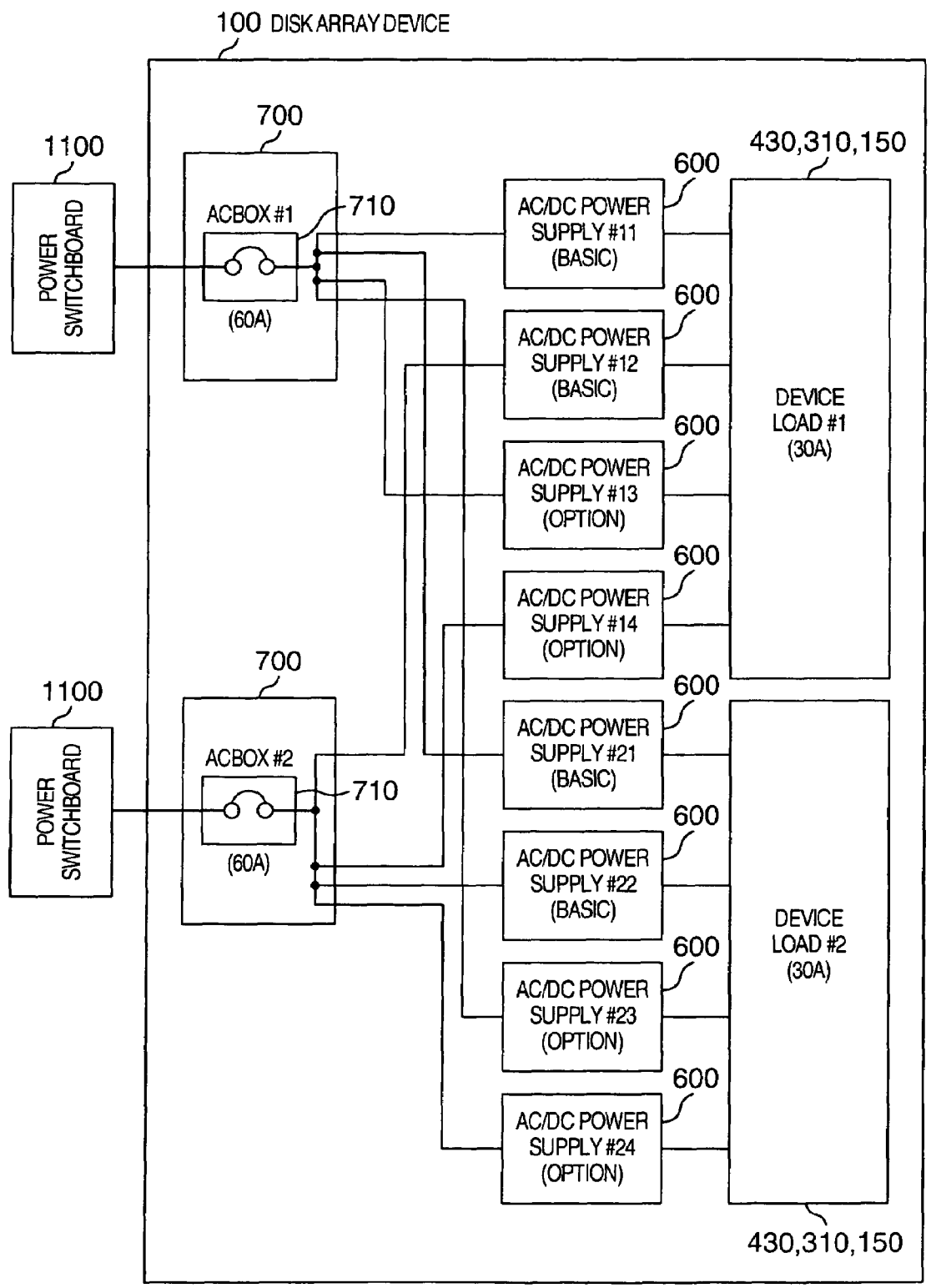
FIG. 11 is a block diagram showing power supply to device loads of a storage device.

The current consumption also increases when the disk array device 100 is scaled up (e.g. when the HDD units 310 or disk adapters 134 are increased for enlarging storage capacity of the disk array device 100). For example, if we assume that the current consumption of each device load #1, #2 increased to 30 A as shown in FIG. 11, the breaker 710 of each AC box 700 has to be replaced with one that can withstand at least 60 A, and the same applies to the power switchboard 1100. The modification of the AC box 700 for attaining high current-carrying capacity (replacing the AC box 700, cables, etc.) is relatively easy, whereas increasing the current-carrying capacity of the power switchboard 1100 requires electrical work to the facilities which is not easy. Further, the increase of current-carrying capacity of the power switchboard 1100 might require modification of contract with the electric power company and it might increase electricity charges and running cost of the disk array device 100.

Figure 12:
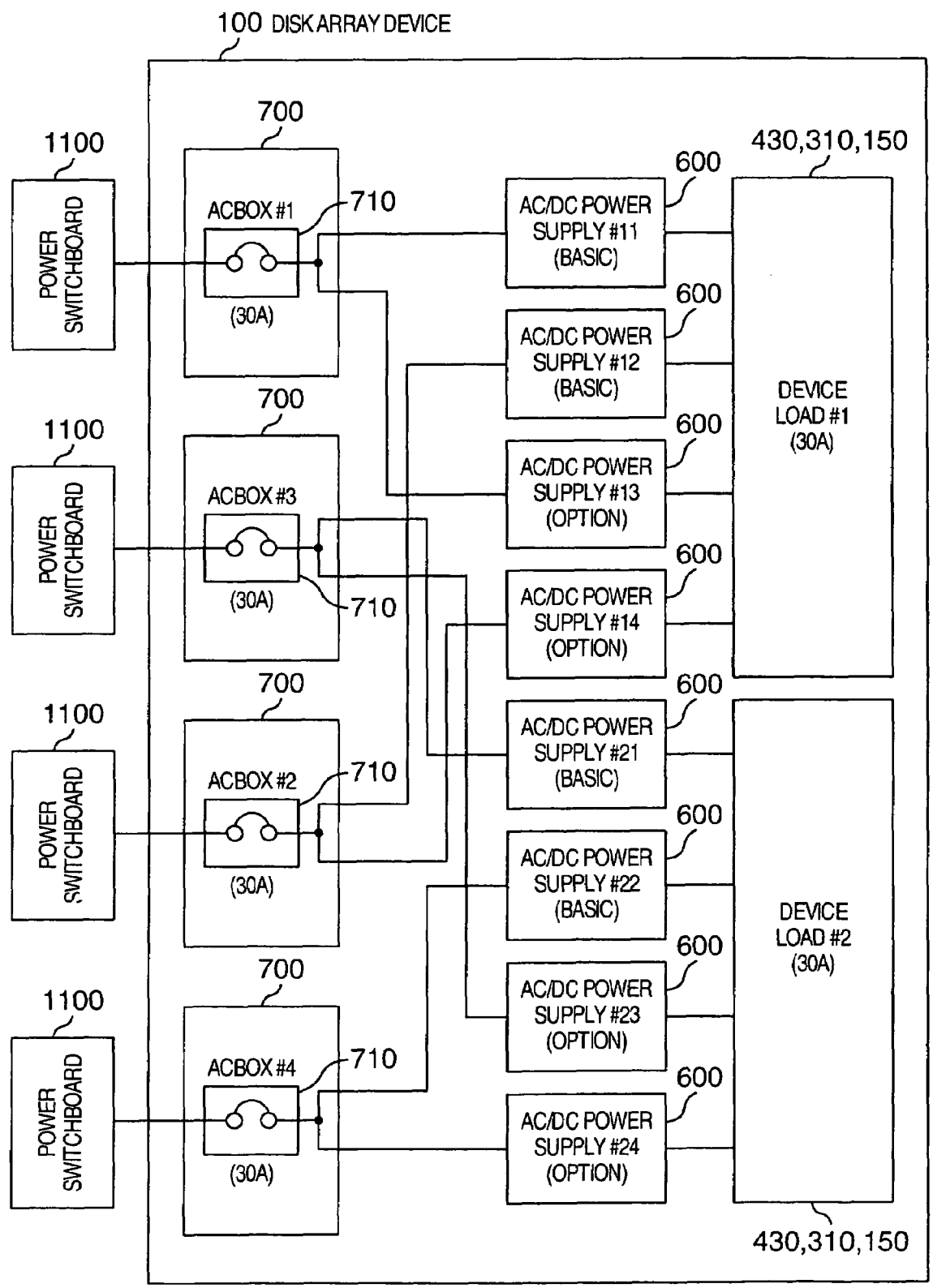
FIG. 12 is a block diagram showing power supply to device loads of a storage device.

As a measure for scaling up the disk array device 100 without increasing the current-carrying capacity of the AC box 700 and the power switchboard 1100, it is possible to implement each AC box 700 in FIG. 11 by two AC boxes 700 as shown in FIG. 12. In FIG. 12, the AC box #1 in FIG. 11 is implemented by two AC boxes #1 and #3, and the AC box #2 in FIG. 11 is implemented by two AC boxes #2 and #4. By such composition, the current-carrying capacity of each AC box 700 can be kept down at 30 A.

Figure 13:
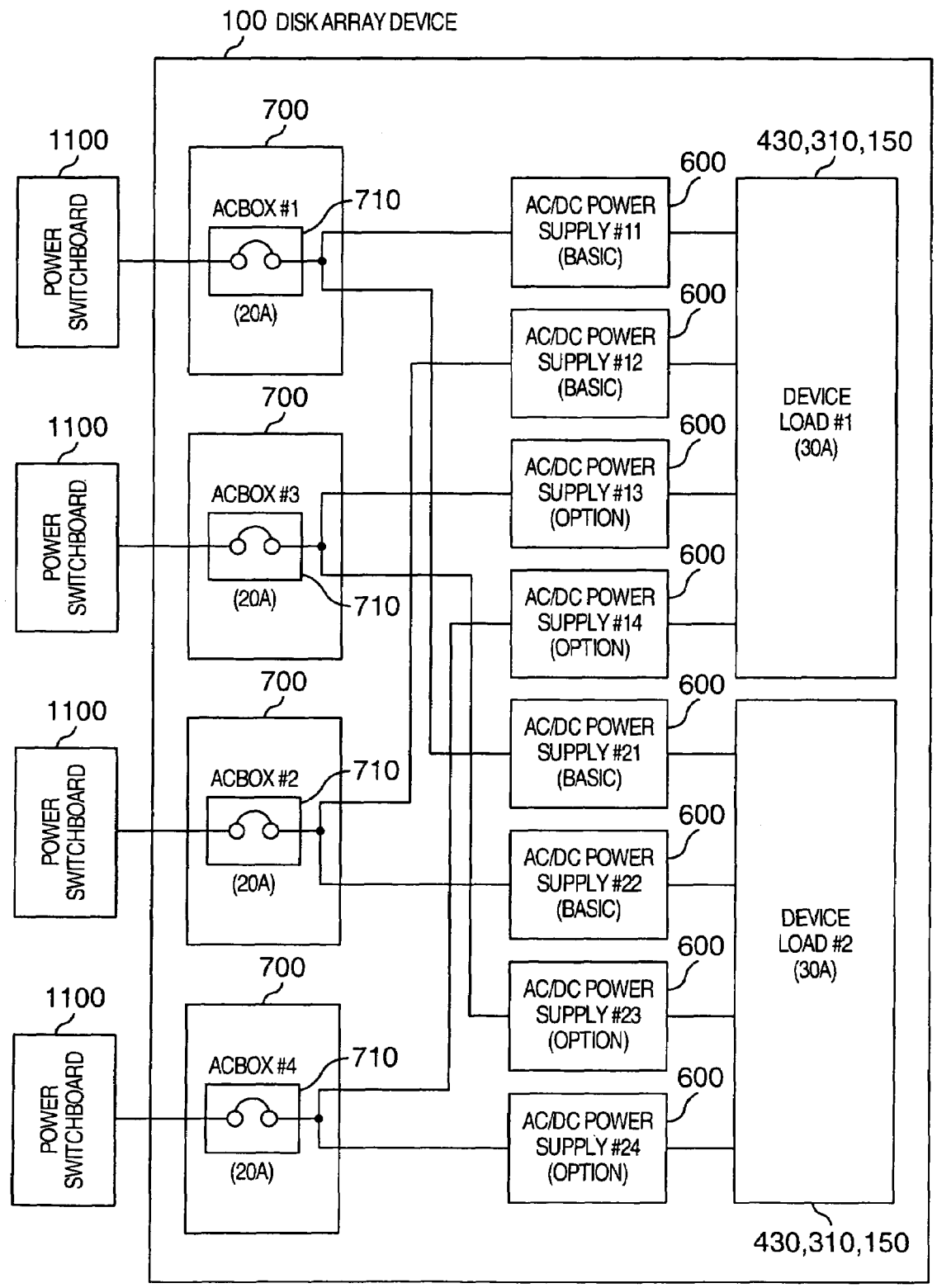
FIG. 13 is a block diagram showing power supply to device loads of the storage device according to the embodiment.

In the disk array device 100 of this embodiment, it is possible to reduce the current-carrying capacity of each AC box 700 to 20 A as shown in FIG. 13. In the example of FIG. 13, each AC box 700 is connected to an AC/DC power supply 600 (first power supply device) for supplying power to the device load #1 and an AC/DC power supply 600 (second power supply device) for supplying power to the device load #2, and each AC/DC power supply 600 is provided with the current balancing circuit 620 for equalizing the outputs of the AC/DC power supplies 600. For example, in case where the breaker 710 of the AC box #4 trips and thereby power supply from the AC box #4 is interrupted, power supply from the AC/DC power supply #14 to the device load #1 and power supply from the AC/DC power supply #24 to the device load #2 are interrupted. In this state, the current consumption 30 A of the device load #1 has to be covered by remaining three AC/DC power supplies #11, #12 and #13, and the current consumption 30 A of the device load #2 has to be covered by remaining three AC/DC power supplies #21, #22 and #23. Since each AC/DC power supply 600 is provided with the current balancing circuit 620, the current consumption to be covered by each AC/DC power supply 600 becomes 10 A. Since each AC box #1-#3 supplies power to two AC/DC power supplies 600, power supply to the disk array device 100 can be maintained avoiding interruption by implementing each AC box #1-#3 (700) by one capable of withstanding at least 20 A. While interruption of power supply from the AC box #4 has been taken as an example, other cases (interruption of power supply from AC box #1, #2 or #3) are similar to the above case and thus description thereof is omitted for brevity.

As above, the disk array device 100 of this embodiment is capable of avoiding the increase of current-carrying capacity of the AC boxes 700 and the power switchboard 1100 even when the current consumption increases due to scaling up of the disk array device 100, by which the need of electrical work to the facilities and modification of the electric power contract can be eliminated and thereby costs and load on the user for the installation of the disk array device 100 can be reduced.

Further, in the disk array device 100 of this embodiment, each AC box 700 is connected to an AC/DC power supply 600 supplying power to the device load #1 and an AC/DC power supply 600 supplying power to the device load #2. Therefore, the AC/DC power supplies 600 and AC boxes 700 can be increased or decreased flexibly depending on the scale of the disk array device 100. For example, in the example of FIG. 13, the AC box #4 (for supplying power to the AC/DC power supplies #14 and #24) can be added to the disk array device 100 at the point when the AC/DC power supplies #14 and #24 (marked as "option") are added to the device loads #1 and #2 respectively. Thus, by the embodiment, a disk array device 100 of a scale meeting the user's needs can be provided to the user while providing the disk array device 100 with the power supply matching the scale.

Further, the ratio among the currents passing through the AC boxes 700 can be changed by inputting the balance setting signal to the current balancing circuit 620 of each AC/DC power supply 600, by which flexible and suitable power supply can be realized depending on the power supply equipment of the user. For example, it is also possible to let the disk array device 100 of this embodiment receive power supply by use of three AC boxes 700 as shown in FIG. 14.

Figure 14:
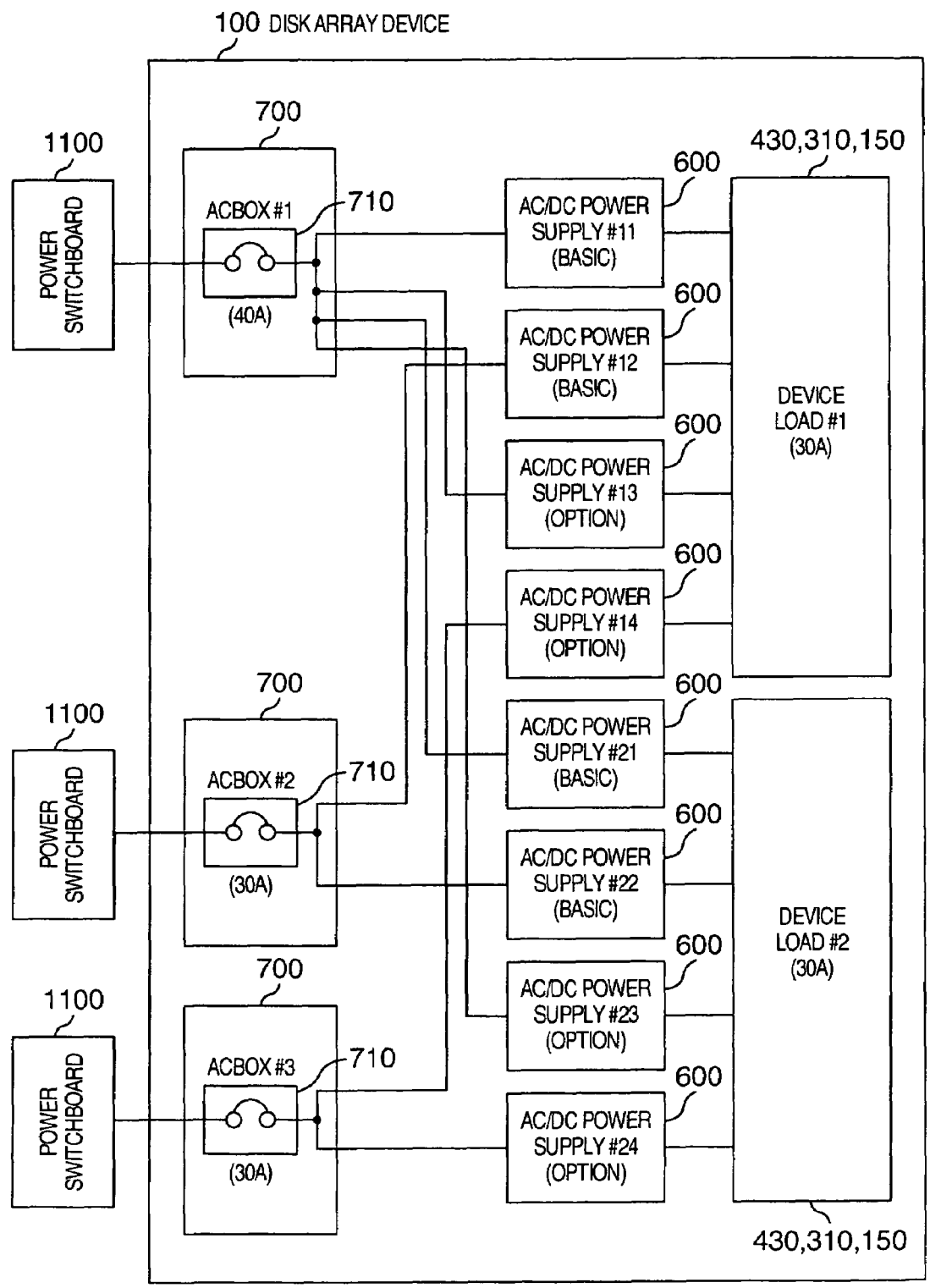
FIG. 14 is a block diagram showing power supply to device loads of the storage device according to the embodiment.

In the example of FIG. 14, in case where the breaker 710 of the AC box #1 trips and thereby power supply from the AC box #1 is interrupted for example, power supply from the AC/DC power supplies #11 and #13 to the device load #1 and power supply from the AC/DC power supplies #21 and #23 to the device load #2 are interrupted. In this state, the current consumption 30 A of the device load #1 has to be covered by remaining two AC/DC power supplies #12 and #14, and the current consumption 30 A of the device load #2 has to be covered by remaining two AC/DC power supplies #22 and #24. Since each AC/DC power supply 600 is provided with the current balancing circuit 620, the current consumption to be covered by each AC/DC power supply 600 becomes 15 A. Since each AC box #2, #3 supplies power to two AC/DC power supplies 600, power supply to the disk array device 100 can be maintained avoiding interruption by implementing each AC box #2, #3 (700) by one capable of withstanding at least 30 A.

Meanwhile, in case where the breaker 710 of the AC box #3 trips and thereby power supply from the AC box #3 is interrupted for example, power supply from the AC/DC power supply #14 to the device load #1 and power supply from the AC/DC power supply #24 to the device load #2 are interrupted. In this state, the current consumption 30 A of the device load #1 has to be covered by remaining three AC/DC power supplies #11, #12 and #13, and the current consumption 30 A of the device load #2 has to be covered by remaining three AC/DC power supplies #21, #22 and #23. Since each AC/DC power supply 600 is provided with the current balancing circuit 620, the current consumption to be covered by each AC/DC power supply 600 becomes 10 A. Since the AC box #1 supplies power to four AC/DC power supplies 600, power supply to the disk array device 100 can be maintained avoiding interruption by implementing the AC box #1 (700) by one capable of withstanding at least 40 A. Meanwhile, since the AC box #2 supplies power to two AC/DC power supplies 600, power supply to the disk array device 100 can be maintained avoiding interruption by implementing the AC box #2 (700) by one capable of withstanding at least 20 A. Interruption of power supply from the AC box #2 is similar to the above case and thus explanation thereof is omitted for brevity.

As above, in the example of FIG. 14, by employing the AC box #1 that can withstand at least 40 A and the AC boxes #2 and #2 that can withstand at least 30 A, the interruption of power supply to the disk array device 100 can be avoided even in case of interruption of power supply from an AC box 700.

Figure 17:
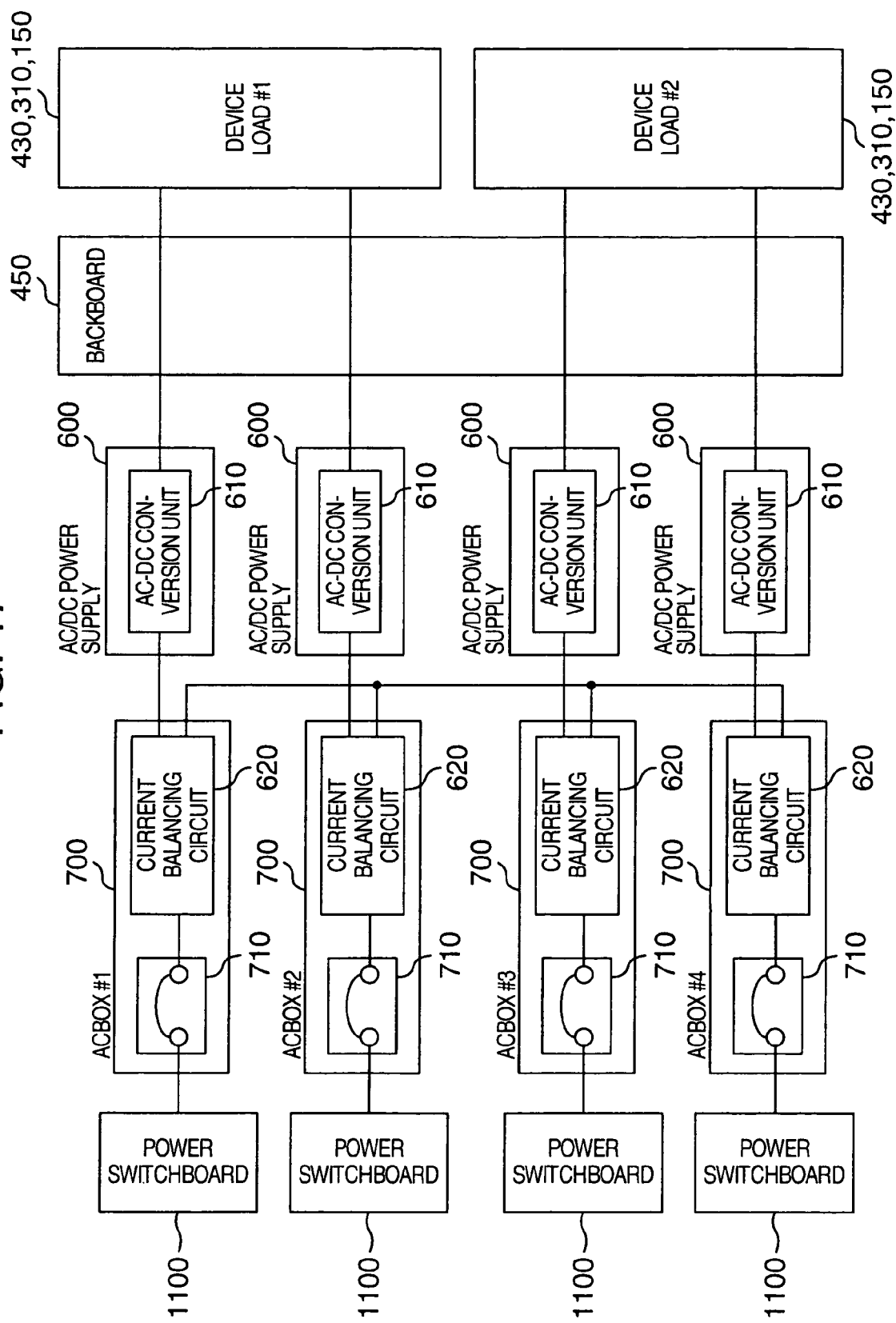
FIG. 17 is a block diagram showing the mechanism of power supply of the storage device of the embodiment.

Incidentally, it is also possible to provide the current balancing circuit 620 to each AC box 700 and equalize output currents of the AC boxes 700 as shown in FIG. 17. The equalization of the output currents of the AC boxes 700 makes it possible to employ the same AC boxes (withstanding at least 30 A) for all the AC boxes #1-#3 in the example of FIG. 14.

Concretely, in the case where the breaker 710 of the AC box #1 trips and thereby power supply from the AC box #1 is interrupted, power supply from the AC/DC power supplies #11 and #13 to the device load #1 and power supply from the AC/DC power supplies #21 and #23 to the device load #2 are interrupted. In this state, the current consumption 30 A of the device load #1 has to be covered by remaining two AC/DC power supplies #12 and #14, and the current consumption 30 A of the device load #2 has to be covered by remaining two AC/DC power supplies #22 and #24. In this case, the AC/DC power supplies #12 and #22 are fed by the AC box #2 and the AC/DC power supplies #14 and #24 are fed by the AC box #3, and thus a current of 30 A passes through each of the AC boxes #2 and #3 and a current of 15 A passes through each of the AC/DC power supplies #12, #22, #14 and #24. Therefore, power supply to the disk array device 100 can be maintained avoiding interruption by implementing each AC box #2, #3 (700) by one capable of withstanding at least 30 A.

Meanwhile, in the case where the breaker 710 of the AC box #3 trips and thereby power supply from the AC box #3 is interrupted, power supply from the AC/DC power supply #14 to the device load #1 and power supply from the AC/DC power supply #24 to the device load #2 are interrupted. In this state, the current consumption 30 A of the device load #1 has to be covered by remaining three AC/DC power supplies #11, #12 and #13, and the current consumption 30 A of the device load #2 has to be covered by remaining three AC/DC power supplies #21, #22 and #23. In this case, the AC/DC power supplies #11, #13, #21 and #23 are fed by the AC box #1, while the AC/DC power supplies #12 and #22 are fed by the AC box #2. Since each AC box #1, #2 is provided with the current balancing circuit 620, each of the AC/DC power supplies #11, #13, #21 and #23 fed by the AC box #1 outputs a current of 7.5 A, while each of the AC/DC power supplies #12 and #22 fed by the AC box #2 outputs a current of 15 A. Therefore, power supply to the disk array device 100 can be maintained avoiding interruption by implementing each AC box #1, #2 (700) by one capable of withstanding at least 30 A.

As described above, by the disk array device 100 according to the embodiment of the present invention, the increase of current-carrying capacity of the AC boxes 700 and the power switchboard 1100 can be avoided even if the current consumption of the disk array device 100 increases for scaling up. In other words, the number and current-carrying capacity of the AC boxes 700 of the disk array device 100 can be set suitably in combination depending on the number of outlets of the power supply equipment of the place where the disk array device 100 is installed and current-carrying capacity of each outlet. Therefore, even in places where power supply equipment of low current-carrying capacity is only available, the disk array device 100 can be installed without the need of modifying each power supply equipment. In this case, the required current-carrying capacity of each AC box 700 can be reduced by increasing the number of AC boxes 700 to an optimum number, not by successively doubling the number of AC boxes 700 of the disk array device 100.

Further, in the disk array device 100 of this embodiment, the reduction of the current-carrying capacity can be realized by use of at least three AC boxes 700 by employing the current balancing circuits 620, by which the need of electrical work to the facilities and modification of the electric power contract can be eliminated and thereby costs and load on the user for the installation of the disk array device 100 can be reduced. In addition, the current balancing circuit 620 also suppresses fluctuations of current passing through each AC box 700, by which the current-carrying capacity of each AC box 700 can be set almost equal to the current actually passing through the AC box 700. Therefore, the current-carrying capacity of each AC box 700 can be reduced almost to the actual current consumption.

In the disk array device 100 of this embodiment, by use of three or more AC boxes 700, the current passing through each AC box 700 can be prevented from exceeding half the current consumption of the disk array device 100 even in case of failure occurring to an AC box 700, by which the current-carrying capacity of each AC box 700 can be set small. In this case, power supply to the disk array device 100 can be continued by the remaining AC boxes 700, by which reliability of the disk array device 100 can be improved.

The reduction of the current-carrying capacity of the AC boxes 700 enables miniaturization of the AC boxes 700 and downsizing of the disk array device 100.

While particular illustrative embodiments have been described above for facilitating the understanding of the present invention, the present invention is not to be restricted by those embodiments but only by the appended claims. It is to be appreciated that those skilled in the art can change or modify the embodiments without departing from the scope and spirit of the present invention and such equivalents are included in the present invention.

What is claimed is:

1. A storage system, comprising:
   a channel adapter coupled to a host computer and receiving a read/write command sent from the host computer;
   a memory coupled to the channel adapter and storing data transferred from the channel adapter;
   a disk adapter coupled to the memory and transferring data stored in the memory to a plurality of storage regions;
   a plurality of disk drive units having the storage regions and storing data transferred from the disk adapter;
   at least one Direct Current (DC) power supply device supplying DC power to at least one load and having plural phases of Alternate Current Direct Current (AC-DC) converters and a current balancing circuit; and
   at least one Alternate Current (AC) unit having at least one breaker, which breaker interrupts supply of AC power if AC power exceeds a certain level, and receiving AC power supplied from outside and supplying AC power to the DC power supply device,
   wherein the load includes the channel adapter, the memory, the disk adapter or the disk drive units, and
   wherein the current balancing circuit balances DC power supplied from the plural phases of AC-DC converters.

2. A storage system according to claim 1 wherein the plural phases of AC-DC converters are three phases of AC-DC converters.

3. A storage system according to claim 1, wherein the AC unit has a plurality of the breakers,
   wherein a first breaker of the breakers relates to a first phase of the plural phases of AC-DC converters, and
   wherein a second breaker of the breakers relates to a second phase of the plural phases of AC-DC converters.

4. A storage system according to claim 1, wherein each of at least three AC units is the AC unit, and
   wherein at least three AC power supplied from outside each is the AC power supplied from outside and each AC power supplied from outside is supplied to one of the AC units.

5. A storage system according to claim 1, wherein each of a plurality of AC power supply devices each is the DC power supply device,
   wherein a plurality of DC units each is the AC unit, and
   wherein the DC power supply devices and the AC units are connected by at least one power subtly line.

6. A storage system according to claim 1, wherein the DC power supply device and the AC unit are connected by at least one power supply line.

7. A storage system according to claim 1, wherein the channel adapter has a DC-DC converter,
   wherein the memory has a DC-DC converter,
   wherein the disk adapter has a DC-DC converters, and
   wherein each of the disk drive units has a DC-DC converter.

8. A storage system according to claim 1, wherein a plurality of DC power supply devices each is the DC power supply device,
   wherein a plurality of AC units each is the AC unit,
   wherein a first AC unit of the AC units relates to a first DC power supply device of the DC power supply devices, and
   wherein a second AC unit of the AC units relates to a second DC power supply device of the DC power supply devices.

9. A storage system according to claim 1, wherein a plurality of DC power supply devices each is the DC power supply device,
   wherein a plurality of AC units each is the AC unit,
   wherein a first AC unit of the AC units corresponds to a first plurality of DC power supply devices of the DC power supply devices, and
   wherein a second AC unit of the AC units corresponds to a second plurality of DC power supply devices of the DC power supply devices.

10. A storage system according to claim 1, wherein a plurality of DC power supply devices each is the DC power supply device, and
    wherein DC power supplied from each of the DC power supply devices is controlled to be approximately equal.

11. A storage system according to claim 1, wherein each of a plurality of DC power supply devices is the DC power supply device, and
    wherein the relationship between DC power outputted from a first DC power supply device of the DC power supply devices and DC power outputted from a second DC power supply device of the DC dower supply devices is controlled to be to approximately a certain ratio.

12. A storage system according to claim 1, wherein a plurality of DC power supply devices each is the DC power supply device,
    wherein each of the DC power supply devices having a current balancing circuit for balancing DC power supplied from the each of DC power supply devices, and
    wherein a plurality of the current balancing circuits communicate to each other via at least one communication line.

13. A storage system according to claim 1, wherein a plurality of AC units each is the AC unit,
    wherein each of the AC units has a current balancing circuit for balancing AC power output from the each of AC units, and wherein a plurality of the current balancing circuits communicate with each other via at least one communication line.

14. A storage system, comprising:
a channel adapter coupled to a host computer and receiving a read/write command sent from the host computer;
a memory coupled to the channel adapter and storing data transferred from the channel adapter;
a disk adapter coupled to the memory and transferring data stored in the memory to a plurality of storage regions;
a plurality of disk drive units having the storage regions and storing data transferred from the disk adapter;
at least one Direct Current (DC) power supply device supplying DC power to at least one load and having plural phases of AC-DC converters;
a current balancing circuit balancing DC power supplied from the plural phases of AC-DC converters; and
at least one Alternate Current (AC) unit having at least one breaker, which breaker interrupts to supply AC power if AC power exceeds a certain level, and receiving AC power supplied from outside and supplying AC power to the DC power supply device,
wherein the load includes the channel adapter, the memory, the disk adapter or the disk drive units.

15. A storage system, comprising:
a channel adapter coupled to a host computer and receiving a read/write command sent from the host computer;
a memory coupled to said channel adapter and stoning data transferred from the channel adapter;
a disk adapter coupled to the memory and transferring data stored in the memory to a plurality of storage regions;
a plurality of disk drive units having the storage regions and storing data transferred from the disk adapter;
at least one Direct Current (DC) power supply device supplying DC power to at least one load and having plural phases of AC-DC converters;
a current balancing circuit balancing DC power supplied from the plural phases of AC-DC converters; and
at least one Alternate Current (AC) inputs AC power to the DC power supply device,
wherein the load includes the channel adapter, the memory, the disk adapter or the disk drive units.

16. A storage system, comprising:
a channel adapter coupled to a host computer and receiving a read/write command sent from the host computer;
a memory coupled to the channel adapter and storing data transferred from the channel adapter;
a disk adapter coupled to the memory and transferring data stored in the memory to a plurality of storage regions;
a plurality of disk drive units having the storage regions and storing data transferred from the disk adapter;
at least one Alternate Current-Direct Current (AC-DC) power supply device supplying DC power to at least one load and having plural phases of AC-DC converters; and
at least one AC unit supplying AC power to the AC-DC power supply device,
wherein the load includes the channel adapter, the memory, the disk adapter or the disk drive units, and
wherein DC power supplied from the plural phases of AC-DC converters are balanced.

* * * * *